United States Patent
Sekiguchi et al.

[11] Patent Number: 5,858,271
[45] Date of Patent: Jan. 12, 1999

[54] LIQUID CRYSTAL COMPOSITION AND LIQUID CRYSTAL DISPLAY DEVICE

[75] Inventors: Yasuko Sekiguchi; Etsuo Nakagawa; Toyoshiro Isoyama; Tetsuya Matsushita; Katsuyuki Murashiro, all of Chiba, Japan

[73] Assignee: Chisso Corporation, Osaka-fu, Japan

[21] Appl. No.: 796,885

[22] Filed: Feb. 7, 1997

[30] Foreign Application Priority Data

Feb. 9, 1996 [JP] Japan .................................. 8-048110

[51] Int. Cl.$^6$ ........................ C09K 19/52; C09K 19/34; C09K 19/30
[52] U.S. Cl. ................ 252/299.01; 252/299.61; 252/299.63; 252/299.64; 252/299.65; 252/299.66
[58] Field of Search ............... 252/299.01, 299.64, 252/299.61, 299.63, 299.65, 299.66

[56] References Cited

U.S. PATENT DOCUMENTS

| | | | |
|---|---|---|---|
| 4,764,619 | 8/1988 | Gunjima et al. | 546/226 |
| 4,904,409 | 2/1990 | Miyazawa et al. | 252/299.61 |
| 5,076,947 | 12/1991 | Kaneoya et al. | 252/299.65 |

*Primary Examiner*—Shean C. Wu
*Attorney, Agent, or Firm*—Wenderoth, Lind & Ponack, L.L.P.

[57] ABSTRACT

Liquid crystal compositions are disclosed which satisfy various characteristics required of liquid crystal compositions used for TN-LCD or STN-LCD display mode, have a low viscosity to cope with the response at a high speed, have a high clearing point to cope with the change in environmental temperature, and have a small dependency of the pitch length on temperature. The liquid crystal compositions comprise, as a first component, at least one liquid crystalline 4-substituted-benzonitrile having a positive dielectric anisotropy, as a second component, at least one liquid crystalline compound having a small positive or negative dielectric anisotropy, and as chiral component A, at least one optically active compound expressed by general formula (X-a) or (X-b)

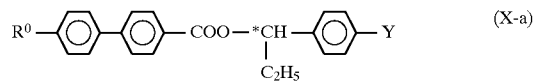

(X-a)

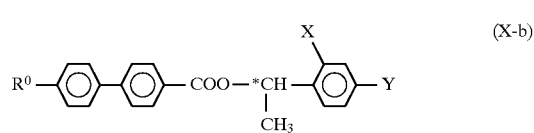

(X-b)

wherein $R^0$ represents an alkyl group or alkoxy group having 1 to 10 carbon atoms, X represents a halogen atom or CN, and Y represents an alkyl group having 1 to 10 carbon atoms or hydrogen atom.

18 Claims, No Drawings

LIQUID CRYSTAL COMPOSITION AND LIQUID CRYSTAL DISPLAY DEVICE

TECHNICAL FIELD

The present invention relates to a nematic liquid crystal composition filled in a closed cell formed with two substrates having a transparent electrode and comprising at least one, preferably at least two chiral dopants, and relates to a liquid crystal display device comprising the liquid crystal composition. More specifically, the present invention relates to a liquid crystal composition preferably used for super twist nematic (STN) mode and relates to a liquid crystal display device comprising the liquid crystal composition.

BACKGROUND ART

As the display mode of liquid crystal display devices (LCD), twist nematic (TN) mode, super twist nematic (STN) mode, and active matrix (AM-LCD) mode have been proposed and used one after another in practice. Among these, the super twisted nematic (STN) mode which was proposed by T. J. Scheffer et al. (Appl. Phy. Lett., 45 (10), 1021 (1984)) and in which the orientation of liquid crystal molecules arranged between an upper and a lower substrates is twisted by 180° to 270° was adopted as LCD of personal computers and word processors, and the improvement in various characteristics of liquid crystal compositions have come to be required.

Following characteristics are required of liquid crystal compositions used for liquid crystal display devices of STN mode:

(1) Liquid crystal compositions exhibit a nematic liquid crystal phase at a wide temperature range including room temperature. Especially, liquid crystal compositions have a high nematic-isotropic phase transition temperature (clearing point).

(2) Threshold voltage of liquid crystal compositions is low to reduce the consumption of electric power.

(3) Viscosity ($\eta$) of liquid crystal compositions is low to shorten response time ($\tau$) as much as possible.

(4) Liquid crystal compositions have an appropriate optical anisotropy ($\Delta n$) depending on liquid crystal display devices (5) Liquid crystal compositions are chemically stable.

Demand particularly for LCD which is characterized by having a small-size and light weight, and being portable (for example, notebook type personal computers) has recently increased. In order to meet with the increased demand, it is necessary to further expand the temperature range at which liquid crystal compositions exhibit a nematic liquid crystal phase, particularly to raise clearing point, to cope with the change in outside environmental temperature.

Further, it has strongly been required to cope with a display of dynamic pictures by means of LCD. In order to cope with the display of dynamic pictures, the response time of liquid crystal compositions at the time when liquid crystal devices are driven must be short. Since response time is proportional to the viscosity of liquid crystal compositions, the development of liquid crystal compositions having a low viscosity have been pursued.

It is an already well known means to repress the reverse twist of liquid crystal molecules and impart a constant helical structure of a righthanded rotation or lefthanded rotation to the molecules by adding a minor amount of an optically active substance to liquid crystal compositions thereby to maintain the quality of display. However, when the ability of the optically active substance added as chiral component in twisting the orientation of liquid crystal molecules is low, it is evident that a necessity of adding the chiral component in a comparatively high concentration arises to obtain a required helical pitch length, and other parameters of liquid crystal compositions are adversely affected. Further, generally known optically active substances are not preferable since the pitch length tend to become larger as temperature raises.

For instance, in a SBE (super-twisted birefringence) mode, the length of the pitch (P) of the orientation of liquid crystal molecules is varied with the change in temperature, and thus, the value of the ratio (P/d) of the pitch length (P) to the cell thickness (d) of a display device is varied. Whereas the P/d is usually adjusted to lower than 2, when the ratio becomes 2 or more with the change in temperature, the twist of 270° of the orientation of liquid crystal molecules is changed to 90°.

Further, from the viewpoint of an improvement for increasing display capacity, a steepness is necessary in the change in transmittance of light when a voltage was increasingly applied to display devices. While G. Baur and W. Fehrenbach have reported at the 15th conference on liquid crystals held at Freiburg in 1985 the result of calculation that the steepness is considerably improved when the twist: was made to 270°, it is considered to be necessary even in the report to lower the dependency of the pitch length on temperature.

In Laid-open Japanese Patent Publication No. Sho 63-22893, optically active compounds having a negative temperature dependence with their pitch length, that is, the substances pitch length of which decrease as temperature raises are disclosed, and a method for obtaining liquid crystal compositions pitch length of which is not varied with the change in temperature by mixing an appropriate amount of the optically active compound with conventional optically active compounds having a positive temperature dependence is proposed as a means to solve the problems mentioned above. Further, in Laid-open Japanese Patent Publication Nos. Hei 1-96155 and Hei 2-48555, optically active compounds having a negative or an extremely small positive temperature dependency of the pitch length and having a high twisting ability are disclosed, and a general formula by which those optically active compounds are expressed include the chiral component A used in the present invention.

However, the optically active compounds disclosed in Laid-open Japanese Patent Publication No. Sho 63-22893 are low in their twisting ability and thus, they must be added in a high concentration to obtain a required pitch length. In Laid-open Japanese Patent Publication Nos. Hei 1-96155 and Hei 2-48555, the clearing point and viscosity of Liquid crystal compositions are not described at all, but only examples of mixtures with cyano type liquid crystalline compounds and temperature characteristics of the pitch length are described.

As discussed above, whereas diligent studies are being carried out on liquid crystal compositions for various purposes, it is a current state that new improvements are required all the time.

DISCLOSURE OF THE INVENTION

An object of the present invention is to provide liquid crystal compositions which have a low viscosity to cope with a high speed response, have a high clearing point to cope with the change in environmental temperature, and have a small dependency of the pitch length on temperature, while satisfying the various characteristics mentioned above and required for STN display mode.

As a result of the diligent investigation by the present inventors on compositions comprising various liquid crystalline compounds to solve the subjects, it has been found that the object can be achieved when the liquid crystal compositions of the present invention are used for STN display devices.

First aspect of the present invention is concerned with a liquid crystal composition (1) comprising, as a first component, at least one compound selected from the group consisting of the compounds expressed by any one of general formulas (I-a) to (I-e)

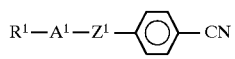
(I-a)

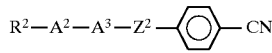
(I-b)

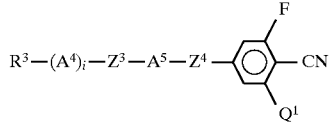
(I-c)

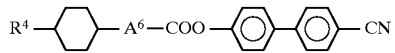
(I-d)

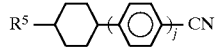
(I-e)

wherein $R^1$, $R^2$, $R^3$, $R^4$, and $R^5$ independently represent an alkyl group having 1 to 10 carbon atoms or an alkenyl group having 2 to 10 carbon atoms, any one or not-adjacent two or more methylene groups (—$CH_2$—) in the alkyl or alkenyl group may be replaced by oxygen atom (—O—), $A^1$ represents trans-1,4-cyclohexylene, 1,4-phenylene, or 1,3-dioxane-trans-2,5-diyl, $A^2$, $A^3$, $A^4$, $A^5$, and $A^6$ independently represent trans-1,4-cyclohexylene or 1,4-phenylene, $Z^1$ represents —COO—, —$CH_2CH_2$—, or single bond provided that when $A^1$ represents trans-1,4-cyclohexylene, $Z^1$ does not represent single bond; $Z^2$ represents —$CH_2CH_2$—, or single bond provided that when $A^2$ represents trans-1,4-cyclohexylene and $A^3$ represents 1,4-phenylene, $Z^2$ does not represent single bond; $Z^3$ represents —$CH_2CH_2$— or single bond, $Z^4$ represents —COO—, —$CH_2CH_2$—, or single bond, $Q^1$ represents H or F, i is 0 or 1, and j is 1 or 2, (2) comprising, as a second component, at least one compound selected from the group consisting of the compounds expressed by general formula (II), (III), or (IV)

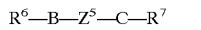
(II)

wherein $R^6$ and $R^7$ independently represent an alkyl group having 1 to 10 carbon atoms or an alkenyl group having 2 to 8 carbon atoms, any one or not-adjacent two or more methylene groups (—$CH_2$—) in the alkyl or alkenyl group may be replaced by oxygen atom (—O—), B represents trans-1,4-cyclohexylene, pyrimidine-2,5-diyl, or 1,4-phenylene, C represents trans-1,4-cyclohexylene or 1,4-phenylene, and $Z^5$ represents —C≡C—, —COO—, —$CH_2CH_2$—, —CH=CH—, —CF=CF—, or single bond,

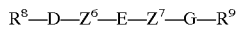
(III)

wherein $R^8$ represents an alkyl group having 1 to 10 carbon atoms or an alkenyl group having 2 to 10 carbon atoms, any one or not-adjacent two or more methylene groups (—$CH_2$—) in the alkyl or alkenyl group may be replaced by oxygen atom (—O—), $R^9$ represents an alkyl group, alkoxy group, or alkoxymethyl group having 1 to 10 carbon atoms, D represents trans-1,4-cyclohexylene or pyrimidine-2,5-diyl, E represents trans-1,4-cyclohexylene, or 1,4-phenylene one of H at a side position of which may be replaced by F, G represents trans-1,4-cyclohexylene or 1,4-phenylene, $Z^6$ represents —$CH_2CH_2$— or single bond, and $Z^7$ represents —C≡C—, —COO—, —CH=CH—, or single bond,

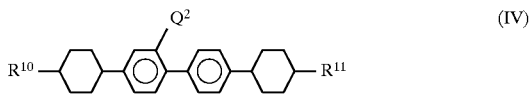
(IV)

wherein $R^{10}$ represents an alkyl group having 1 to 10 carbon atoms or an alkenyl group having 2 to 10 carbon atoms, any one or not-adjacent two or more methylene groups (—$CH_2$—) in the alkyl or alkenyl group may be replaced by oxygen atom (—O—), $R^{11}$ represents an alkyl group, alkoxy group, or alkoxymethyl group having 1 to 10 carbon atoms, and $Q^2$ represents H or F, and (A) comprising, as chiral component A, at least one optically active compound expressed by general formula (X-a) or (X-b)

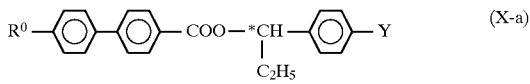
(X-a)

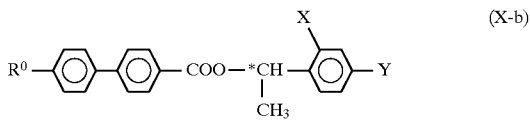
(X-b)

wherein $R^0$ represents an alkyl group or alkoxy group having 1 to 10 carbon atoms, X represents a halogen atom or CN, and Y represents an alkyl group having 1 to 10 carbon atoms or hydrogen atom.

Second aspect of the present invention is concerned with a liquid crystal composition which comprises, in addition to the liquid crystal composition recited in the first aspect mentioned above, as chiral component B, at least one optically active compound selected from the group consisting of the compounds expressed by any one of general formulas (XI-a) to (XI-h)

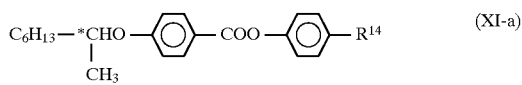
(XI-a)

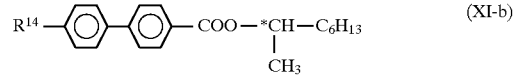
(XI-b)

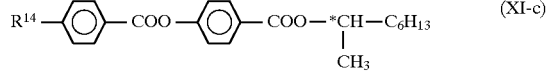
(XI-c)

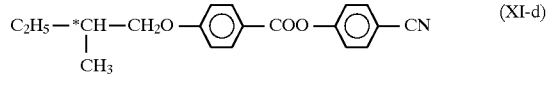
(XI-d)

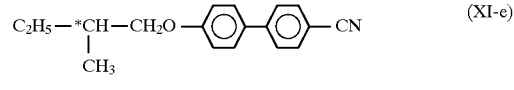
(XI-e)

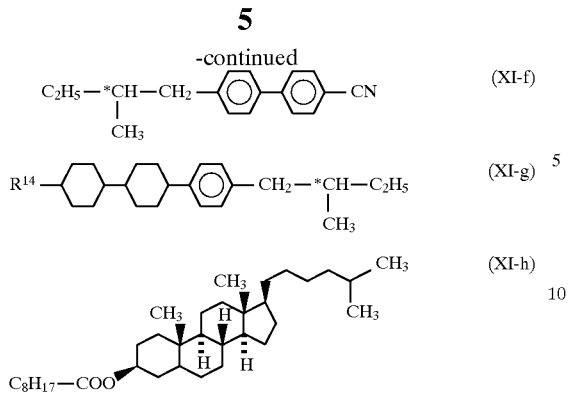

wherein $R^{14}$ represents an alkyl group or alkoxy group having 1 to 10 carbon atoms.

Third aspect of the present invention is concerned with a liquid crystal composition recited in the first aspect mentioned above wherein the liquid crystal composition comprises (1) 10 to 60%, based on the total weight of the liquid crystal composition, of the first component,
(2) 20 to 80%, based on the total weight of the liquid crystal composition, of the second component,
  (A) 0.001 to 5 parts by weight, based on 100 parts by weight of the liquid crystal composition comprising the first component and second component, of a chiral component A, and
  (B) 0 to 5 parts by weight, based on 100 parts by weight of the liquid crystal composition comprising the first component and second component, of a chiral component B.

Fourth aspect of the present invention is concerned with a liquid crystal composition recited in any one of the first aspect to third aspect mentioned above wherein the liquid crystal composition further comprises, (3) as a third component, at least one compounds selected from the group consisting of the compounds expressed by general formula (V) or (VI)

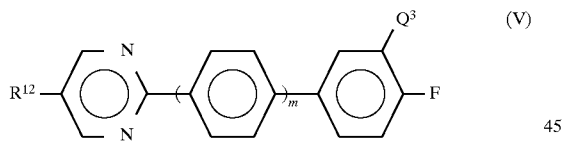

wherein $R^{12}$ represents an alkyl group having 1 to 10 carbon atoms, $Q^3$ represents H or F, and m is 0 or 1,

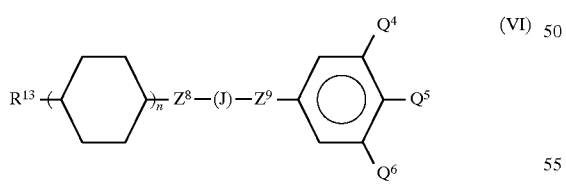

wherein $R^{13}$ represents an alkyl group having 1 to 10 carbon atoms, J represents trans-1,4- cyclohexylene, or 1,4-phenylene one or two H at a side position of which may be replaced by F, $Q^5$ represents F or Cl, $Q^4$ and $Q^6$ independently represent H or F, $Z^8$ and $Z^9$ independently represent —COO—, —$CH_2CH_2$—, or single bond, and n is 0, 1, or 2.

Fifth aspect of the present invention is concerned with a liquid crystal composition recited in any one of the first aspect to the fourth aspect mentioned above wherein the content of the (3) third component is 0 to 50% by weight based on the total amount of the liquid crystal composition.

Sixth aspect of the present invention is concerned with a liquid crystal composition recited in any one of the first aspect to the fifth aspect mentioned above wherein the first component is at least one of the compounds expressed by one of the general formulas (I-a) to (I-e) wherein $R^1$ to $R^5$ independently represent an alkyl group, alkoxy group, or alkoxymethyl group having 1 to 10 carbon atoms.

Seventh aspect of the present invention is concerned with a liquid crystal composition recited in any one of the first aspect to the sixth aspect mentioned above wherein the second component is at least one of the compounds expressed by the general formula (II) wherein $R^6$ and $R^7$ independently represent an alkyl group, alkoxy group, or alkoxymethyl group having 1 to 10 carbon atoms.

Eighth aspect of the present invention is concerned with a liquid crystal composition recited in any one of the first aspect to the seventh aspect mentioned above wherein the second component is at least one of the compounds expressed by the general formulas (III) wherein $R^8$ represents an alkyl group having 1 to 10 carbon atoms, and $R^9$ represents an alkyl group or alkoxy group having 1 to 10 carbon atoms.

Ninth aspect of the present invention is concerned with a liquid crystal display device comprising a liquid crystal composition defined in any one of the first aspect to the eighth aspect mentioned above.

BEST MODE FOR CARRYING OUT THE INVENTION

Liquid crystalline compounds which constitute the liquid crystal compositions of the present invention are described below.

As the compounds which are the first component in the liquid crystal composition of the present invention and are expressed by any one of general formulas (I-a) to (I-e), the following compounds can preferably be mentioned:

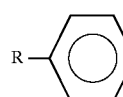

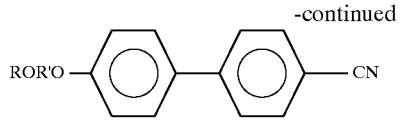 (I-a-2)
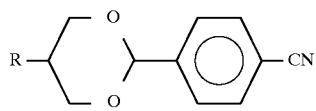 (I-a-3)
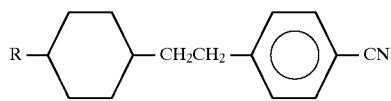 (I-a-4)
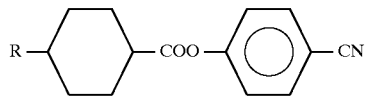 (I-a-5)
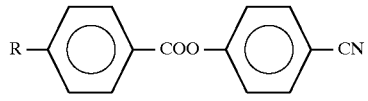 (I-a-6)
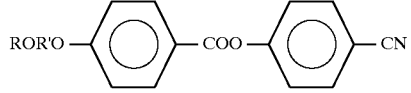 (I-a-7)
 (I-b-1)
 (I-b-3)
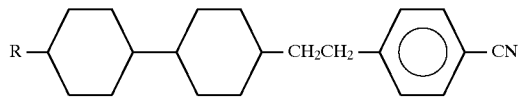 (I-b-4)
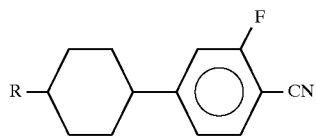 (I-c-1)
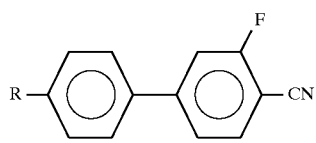 (I-c-2)
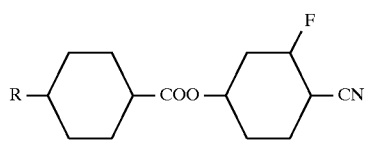 (I-c-3)
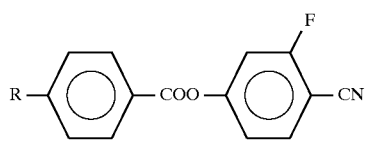 (I-c-4)

-continued
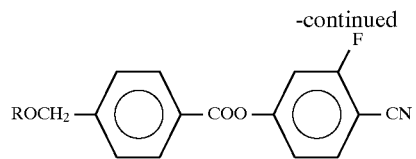
(I-c-5)
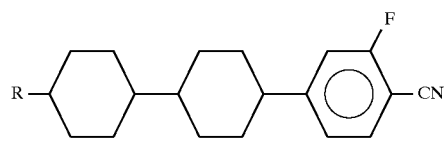
(I-c-6)
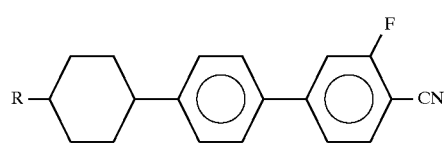
(I-c-7)
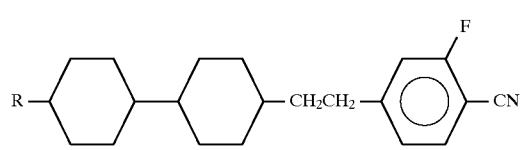
(I-c-8)
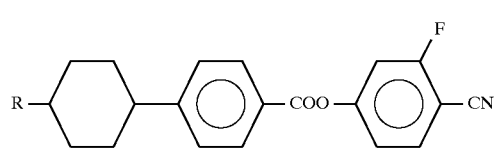
(I-c-9)
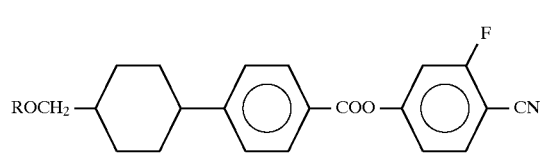
(I-c-10)
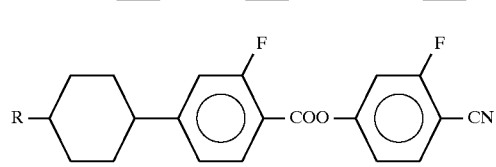
(I-c-11)
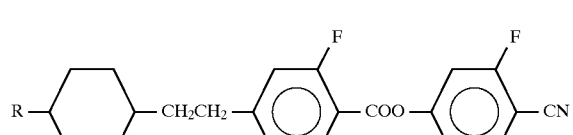
(I-c-12)
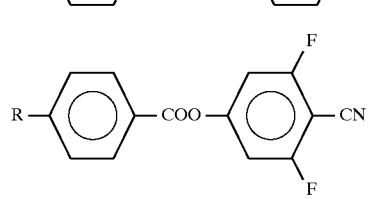
(I-c-13)
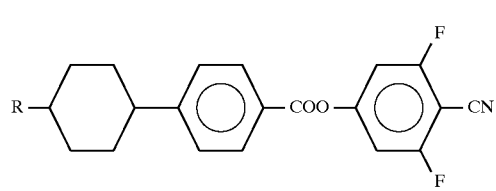
(I-c-14)
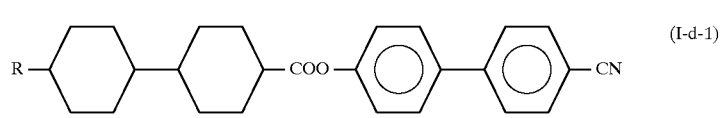
(I-d-1)

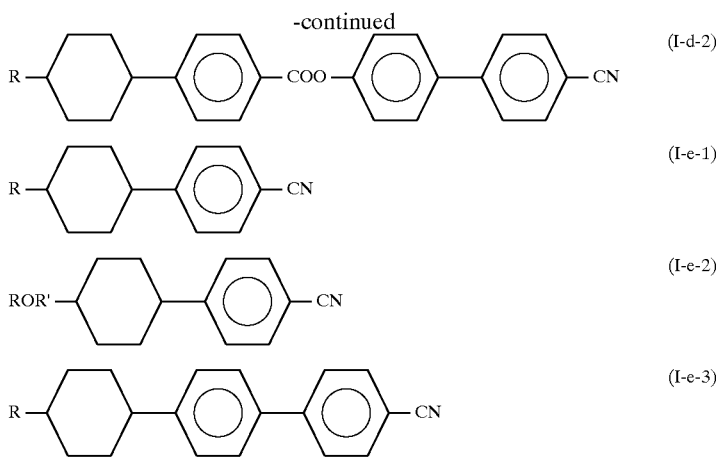

wherein R represents an alkyl group or alkenyl group, and R' represents an alkane diyl or alkene diyl.

Among these compounds, compounds expressed by formula (I-a-1), (I-a-2), (I-a-3), (I-a-6), (I-b-1), (I-b-2), (I-c-1), (I-c-4), (I-c-5), (I-c-6), (I-c-9), (I-c-13), (I-c-14), (I-d-1), (I-d-2), (I-e-1), (I-e-2), or (I-e-3) are preferably used in the present invention in particular.

These compounds of the first component have a particularly large value of positive dielectric anisotropy, and are used mainly for the purpose of lowering threshold voltage and the purpose of improving steepness which is important as a characteristic for STN. In order to drive liquid crystal display devices at a low voltage, these compounds having a large dielectric anisotropy are indispensable component.

As the compounds which are the second component and are expressed by general formula (II), (III), or (IV), the following compounds can preferably be mentioned:

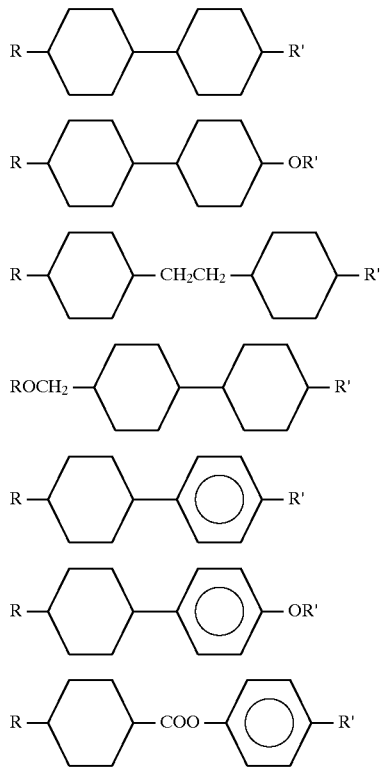

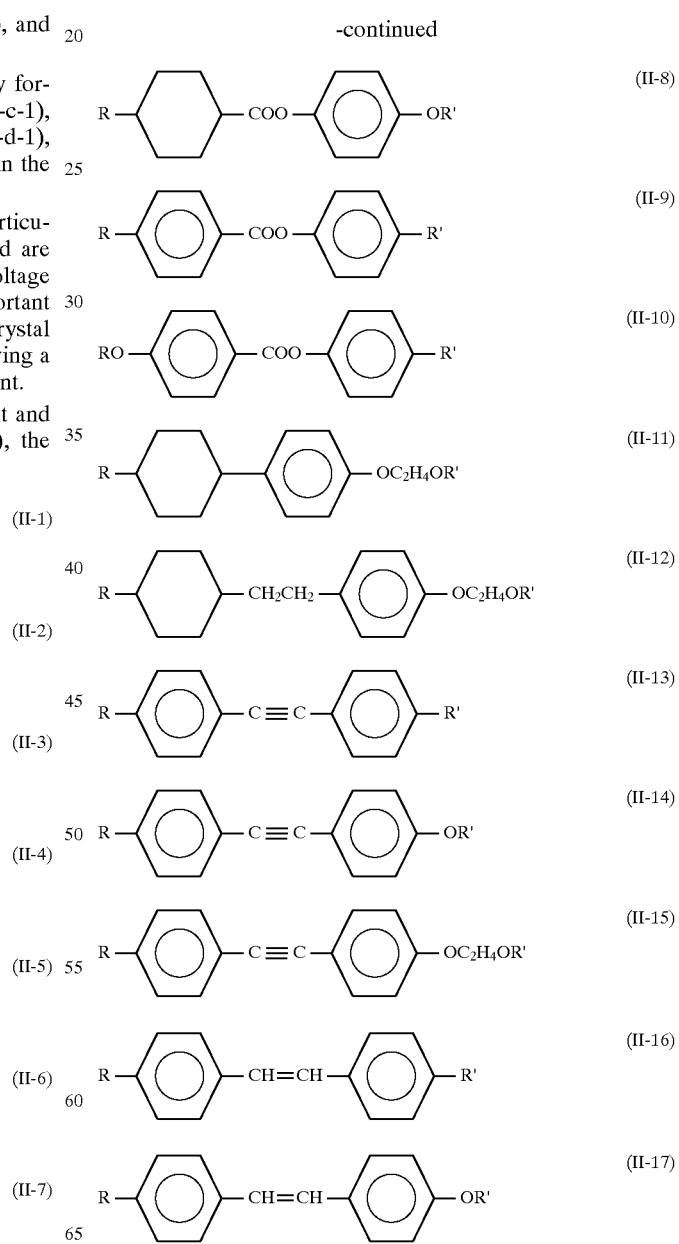

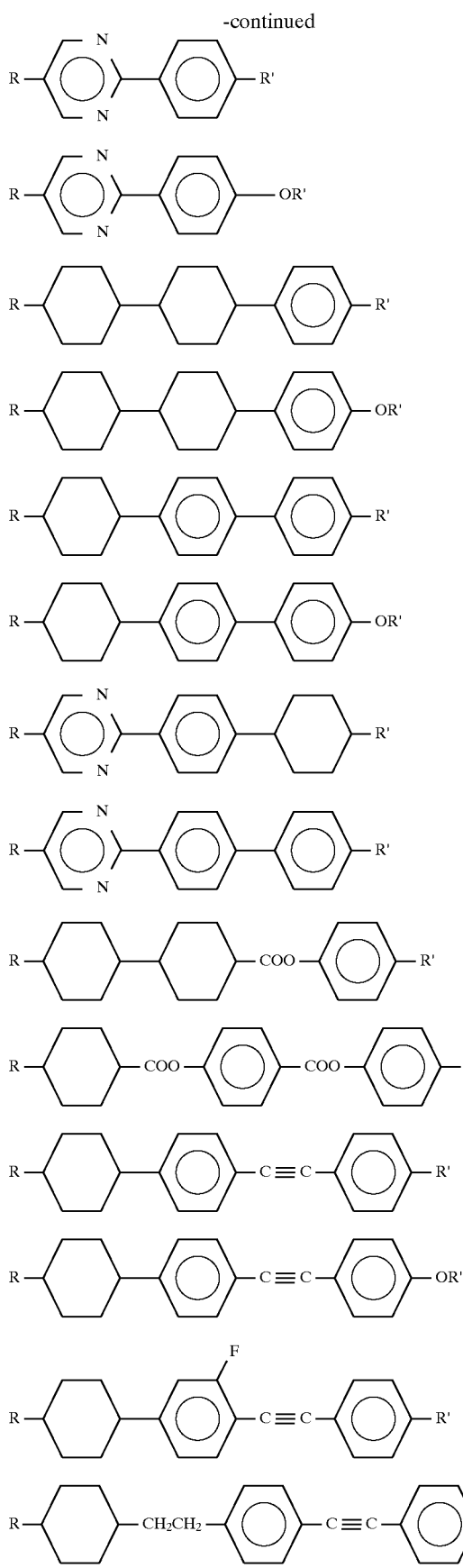

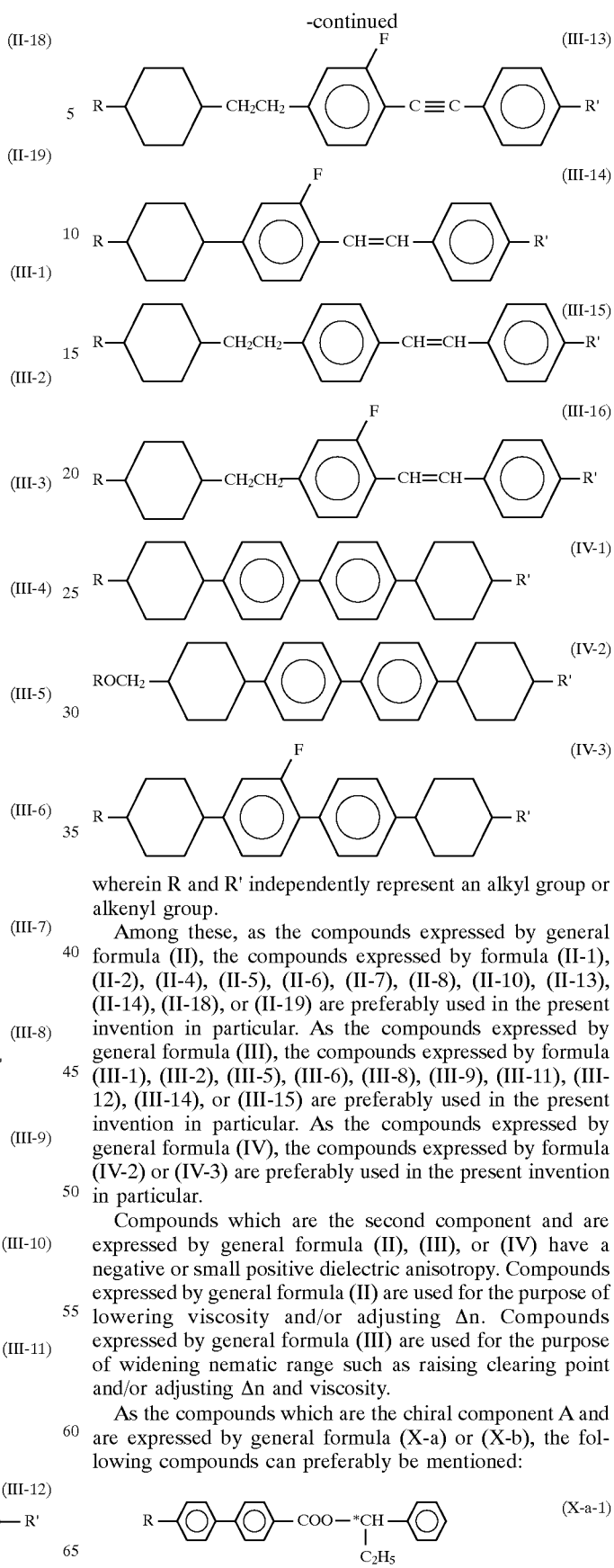

wherein R and R' independently represent an alkyl group or alkenyl group.

Among these, as the compounds expressed by general formula (II), the compounds expressed by formula (II-1), (II-2), (II-4), (II-5), (II-6), (II-7), (II-8), (II-10), (II-13), (II-14), (II-18), or (II-19) are preferably used in the present invention in particular. As the compounds expressed by general formula (III), the compounds expressed by formula (III-1), (III-2), (III-5), (III-6), (III-8), (III-9), (III-11), (III-12), (III-14), or (III-15) are preferably used in the present invention in particular. As the compounds expressed by general formula (IV), the compounds expressed by formula (IV-2) or (IV-3) are preferably used in the present invention in particular.

Compounds which are the second component and are expressed by general formula (II), (III), or (IV) have a negative or small positive dielectric anisotropy. Compounds expressed by general formula (II) are used for the purpose of lowering viscosity and/or adjusting Δn. Compounds expressed by general formula (III) are used for the purpose of widening nematic range such as raising clearing point and/or adjusting Δn and viscosity.

As the compounds which are the chiral component A and are expressed by general formula (X-a) or (X-b), the following compounds can preferably be mentioned:

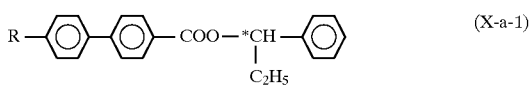

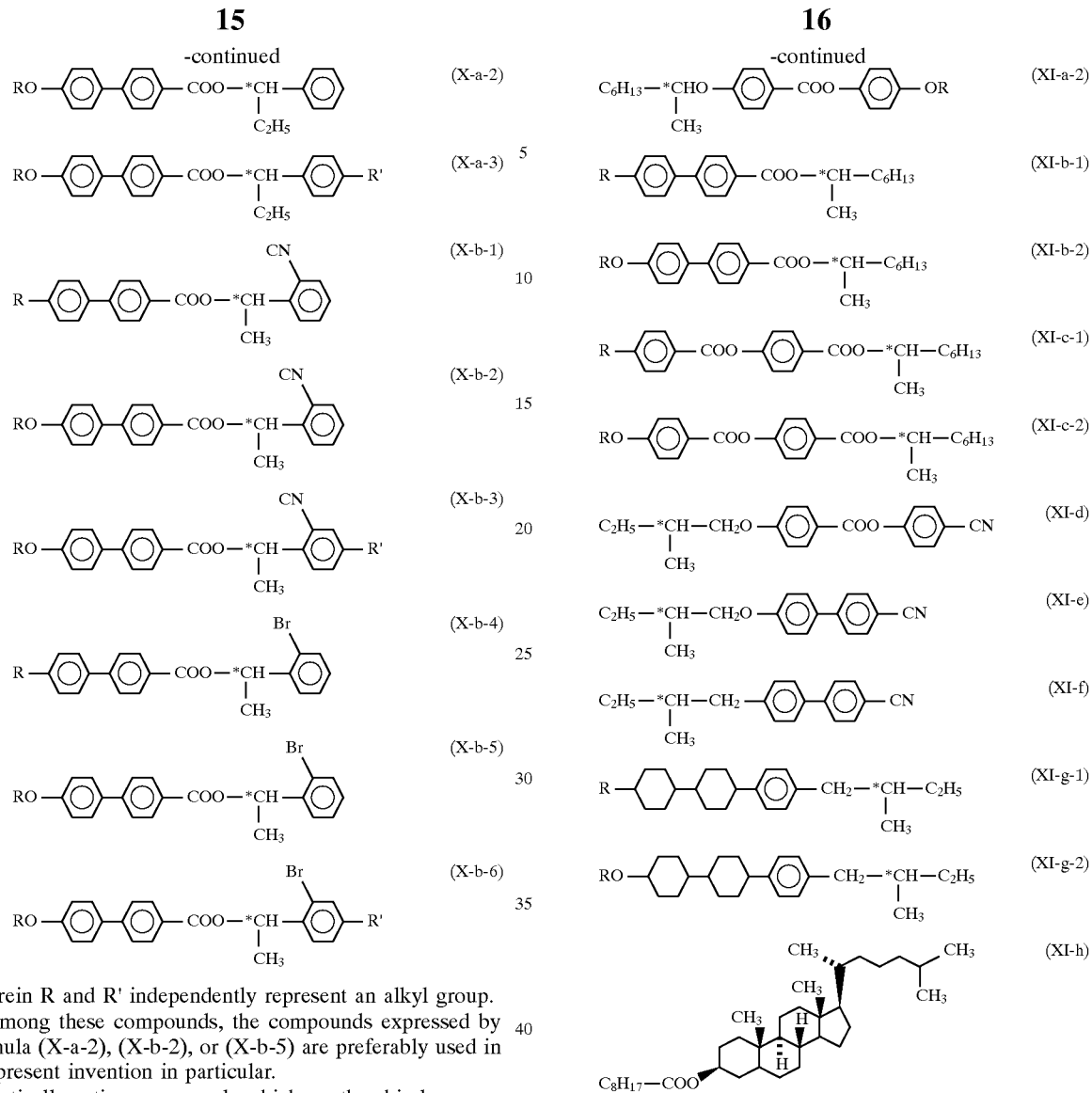

wherein R and R' independently represent an alkyl group.

Among these compounds, the compounds expressed by formula (X-a-2), (X-b-2), or (X-b-5) are preferably used in the present invention in particular.

Optically active compounds which are the chiral component A and expressed by general formula (X-a) or (X-b) have a high helical twisting ability. Accordingly, a desired pitch length can be obtained by the addition of a minor amount of the optically active compound. Further, liquid crystal compositions having a small dependency of the pitch length on temperature can be produced by adding one of the optically active compounds alone or in combination with another compound to a nematic liquid crystal composition.

As the compounds which are the chiral component B and are expressed by one of general formulas (XI-a) to (XI-h), the following compounds can preferably be mentioned:

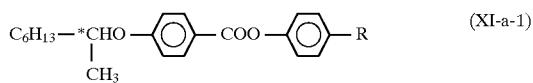

wherein R represents an alkyl group having 1 to 10 carbon atoms.

Among these compounds, the compounds expressed by formula (XI-a-1), (XI-b-2), (XI-c-2), (XI-d), (XI-e), (XI-f), (XI-g-1), or (XI-h) are preferably used in the present invention in particular.

Optically active compounds which are the chiral component B and are expressed by one of general formulas (XI-a) to (XI-h) are used for the purpose of precisely adjusting the pitch length or adjusting the temperature dependency of the pitch length.

As the compounds which are the third component and are expressed by general formula (V) or (VI), the following compounds can preferably be mentioned:

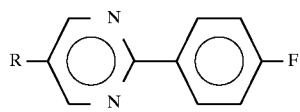

-continued
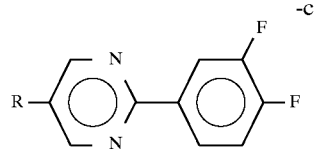
(V-2)
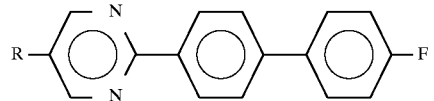
(V-3)
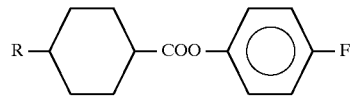
(VI-1)
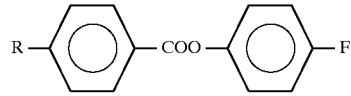
(VI-2)
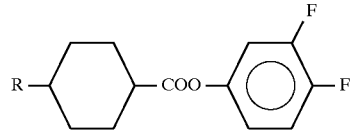
(VI-3)
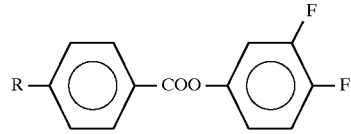
(VI-4)
(VI-5)
(VI-6)
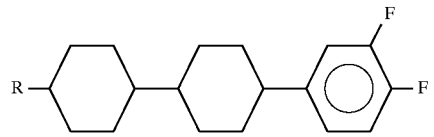
(VI-7)
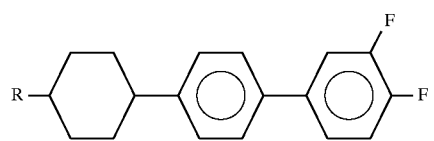
(VI-8)
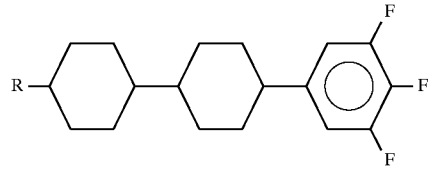
(VI-9)
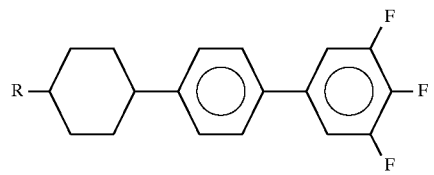
(VI-10)

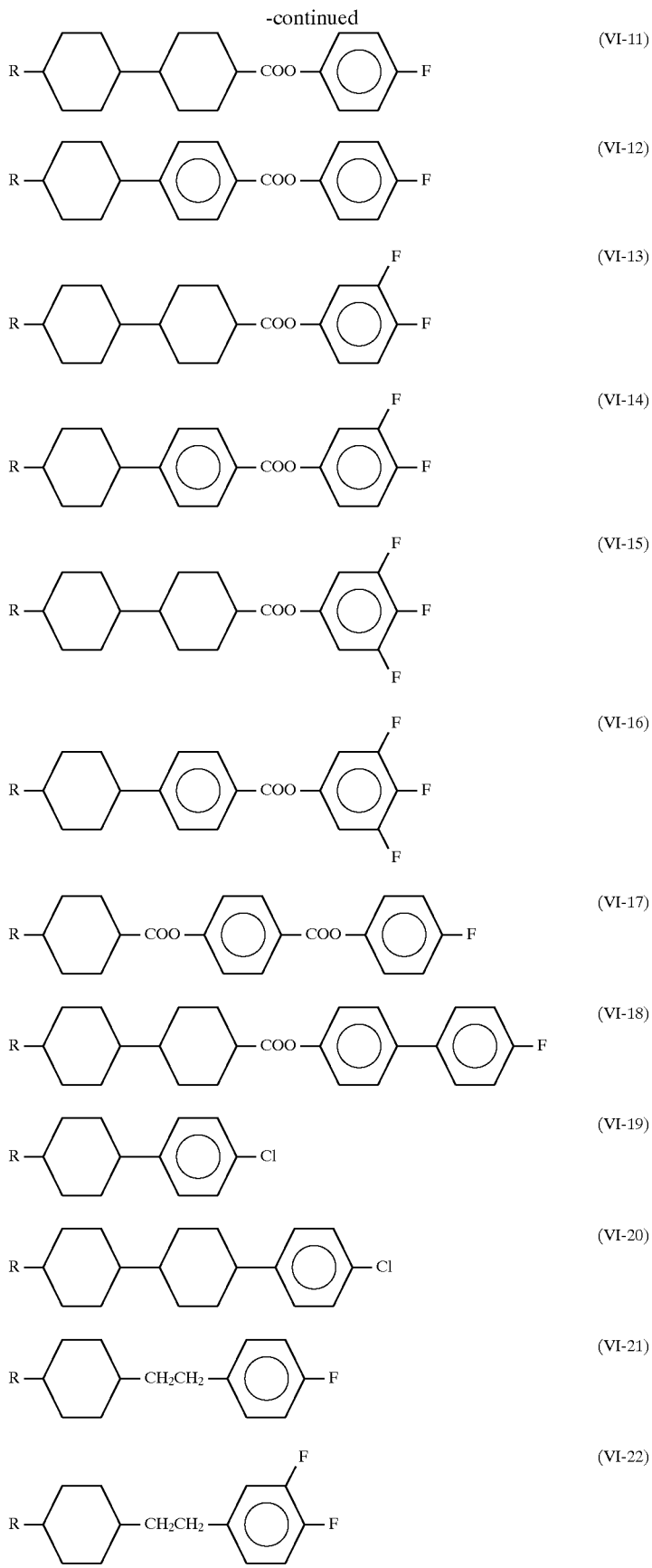

-continued
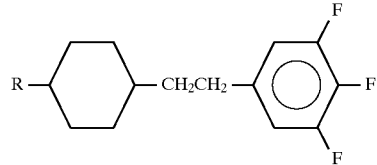
(VI-23)
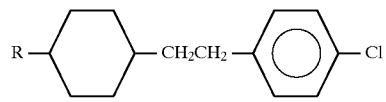
(VI-24)
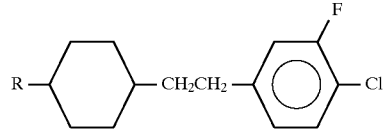
(VI-25)
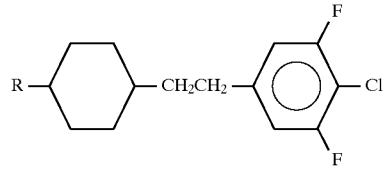
(VI-26)
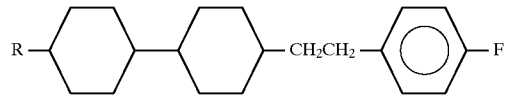
(VI-27)
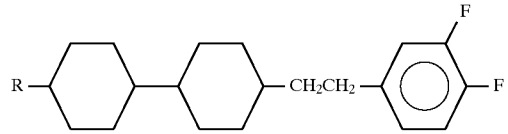
(VI-28)
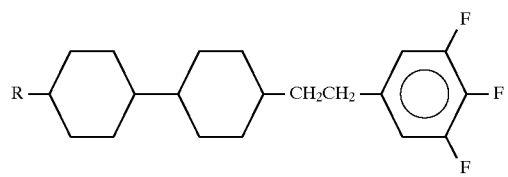
(VI-29)
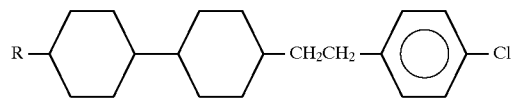
(VI-30)
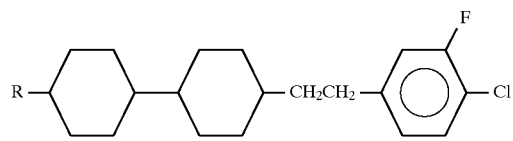
(VI-31)
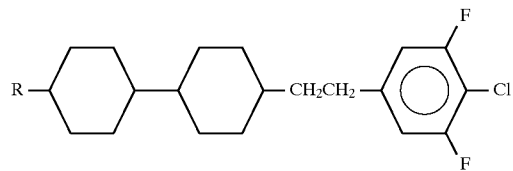
(VI-32)
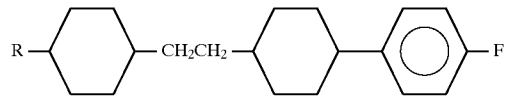
(VI-33)

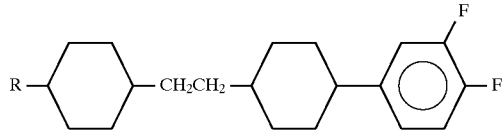
(VI-34)
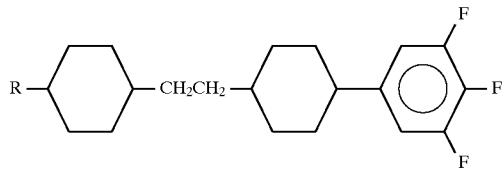
(VI-35)
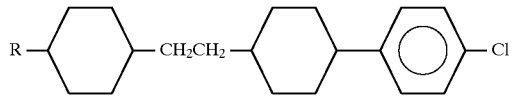
(VI-36)
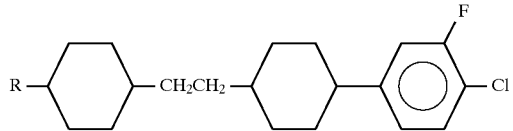
(VI-37)
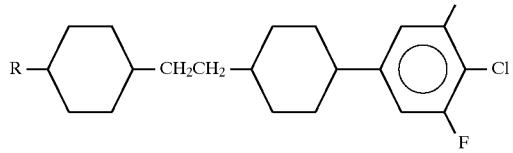
(VI-38)
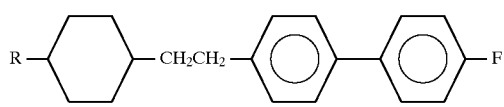
(VI-39)
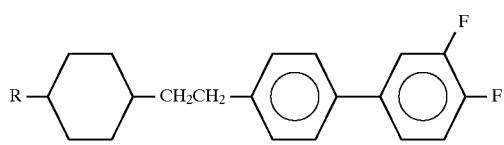
(VI-40)
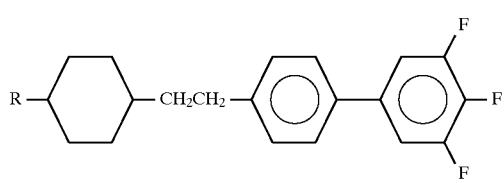
(VI-41)
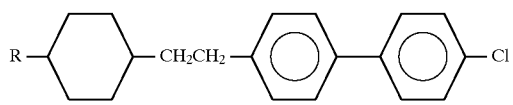
(VI-42)
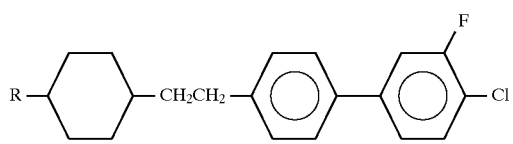
(VI-43)
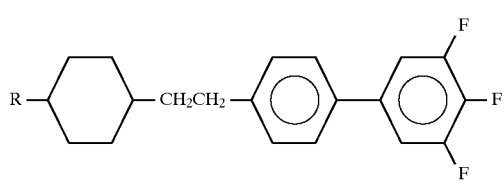
(VI-44)

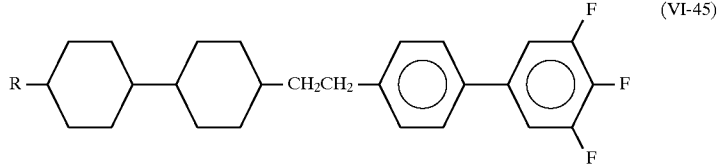
(VI-45)

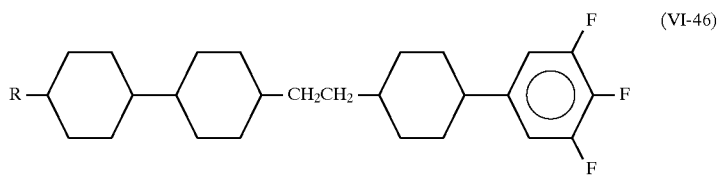
(VI-46)

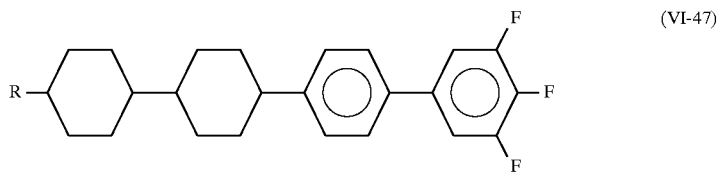
(VI-47)

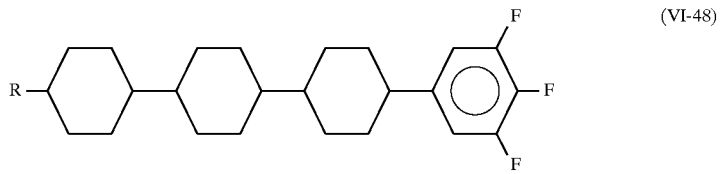
(VI-48)

wherein R represents an alkyl group.

As the compounds expressed by general formula (V), the compounds expressed by formula (V-1, (V-2), or (V-3) are preferably used in the present invention in particular. As the compounds expressed by general formula (VI), the compounds expressed by formula (VI-1), (VI-5), (VI-6), (VI-7), (VI-8), (VI-9), (VI-10), (VI-11), (VI-12), (VI-15), (VI-16), (VI-17), (VI-18), (VI-19), (VI-20), (VI-22), (VI-29), (VI-34), (VI-35), (VI-37), (VI-41), (VI-45), (VI-46), (VI-47), or (VI-48) are preferably used in the present invention in particular.

Compounds expressed by general formula (V) or (VI) have a positive dielectric anisotropy, and are used particularly for the purpose of lowering threshold voltage and for improving its temperature dependency. Also, the compounds are used for the purpose of adjusting viscosity and Δn, and widening nematic range such as raising clearing point.

Amount of the first component to be used in the present invention is preferably 5 to 70% by weight and more desirably 10 to 60% by weight based on the total amount of the liquid crystal composition.

Amount of the second component to be used is preferably 10 to 80% by weight and more desirably 20 to 80% by weight based on the total amount of the liquid crystal composition.

When the third component is used, its amount to be used is preferably less than 50% by weight and more desirably less than 40% by weight based on the total amount of the liquid crystal composition.

Amount of the chiral component A to be used is preferably 0.001 to 5 parts by weight and more desirably 0.005 to 3 parts by weight based on 100 parts by weight of the liquid crystal composition mentioned above.

When the chiral component B is used, its amount to be used is preferably less than 5 parts by weight and more desirably 0.01 to 0.35 part by weight based on 100 parts by weight of the liquid crystal composition.

Depending on the purposes of using liquid crystal display devices of the present invention, other compounds, in addition to those expressed by any one of general formulas (I-a) to (VI) mentioned above, can be added in an appropriate amount within the range wherein the objects of the present invention can be achieved, for the purpose of adjusting threshold voltage, nematic range, Δn, dielectric anisotropy, and viscosity, to the liquid crystal compositions of the present invention.

Liquid crystal compositions of the present invention can be produced by conventional methods which are well known by itself. Generally, methods wherein various components are dissolved each other at a high temperature are adopted. Further, the liquid crystal materials of the present invention can be improved depending on intended purposes by further adding suitable additives, and optimized. Such additives are well known in the art and are also described in the literature.

Liquid crystal compositions of the present invention can also be added with a dichroic dye such as a merocyanine type, styryl type, azo type, azomethine type, azoxy type, quinophthalone type, anthraquinone type, and tetrazine type dichroic dye to use as liquid crystal composition for guest-host mode. Further, the liquid crystal compositions of the present invention can be used as ones for polymer dispersion type liquid crystal display devices typified by NCAP which is prepared by forming a nematic liquid crystal into a microcapsule or typified by a polymer net work liquid crystal display device (PNLCD) which is prepared by forming a polymer of a three-dimensional network structure in a liquid crystal. Also, the liquid crystal compositions of the present invention can be used as ones for electrically controlled birefringence (ECB) mode or dynamic scattering (DS) mode.

According to the present invention, liquid crystal compositions can be provided which have a particularly low viscosity to cope with a high response, have a high clearing point to cope with the change in environmental temperature, and have a small dependency of the pitch on temperature, while satisfying various characteristics required of liquid crystal compositions used for TN-LCD and STN-LCD display modes.

EXAMPLES

Now, the present invention will be described in more detail with reference to Examples and Comparative Examples. However, it should be understood that the present invention is by no means restricted by such specific examples. In Examples and Comparative Examples, chemical composition of liquid crystal compositions are all shown in % by weight for the components of liquid crystals, and in parts by weight based on 100 parts by weight of liquid crystal composition for the chiral components A and B.

In Examples and Comparative Examples, parameter δP which shows the dependency of the pitch length on temperature is defined by the following equation:

$$\delta P = \frac{2(P_{20} - P_{50})}{P_{20} + P_{50}} \times \frac{100}{20 - 50}$$

wherein $P_{20}$ and $P_{50}$ represent the pitch length (μm) at 20° C. and 50° C., respectively. In this connection, the closer the value of δP comes up to 0, the more the liquid crystal composition is preferable.

Comparative Example 1

According to Examples of Laid-open Japanese Patent Publication No. Hei 2-48555, the liquid crystal composition having the following chemical composition was prepared:

| | |
|---|---|
| $C_3H_7$—⬡—◯—CN | 24% |
| $C_5H_{11}$—⬡—◯—CN | 36% |
| $C_7H_{15}$—⬡—◯—CN | 25% |
| $C_5H_{11}$—⬡—◯—◯—CN | 15% |
| $C_8H_{17}O$—◯—◯—COO—*CH(—◯)—$C_2H_5$ | 1 part |

This liquid crystal composition had a clearing point ($T_{NI}$) of 71.1° C., viscosity at 20° C. ($\eta_{20}$) of 35.9 mPa·s, pitch length at 25° C. ($P_{25}$) of 3.7 μm, and temperature dependency of the pitch (δP) of 0.09.

Comparative Example 2

According to Examples of Laid-open Japanese Patent Publication No. Hei 1-96155, the liquid crystal composition having the following chemical composition was prepared:

| | |
|---|---|
| $C_3H_7$—⬡—◯—CN | 24% |
| $C_5H_{11}$—⬡—◯—CN | 36% |
| $C_7H_{15}$—⬡—◯—CN | 25% |
| $C_5H_{11}$—⬡—◯—◯—CN | 15% |
| $C_5H_{11}O$—◯—◯—COO—*CH(CH_3)—◯(CN) | 1 part |

This liquid crystal composition had a clearing point ($T_{NI}$) of 71.5° C., viscosity at 20° C. ($\eta_{20}$) of 36.2 mPa·s, pitch length at 25° C. ($P_{25}$) of 7.4 μm, and temperature dependency of the pitch (δP) of −0.17.

Comparative Example 3

Liquid crystal composition having the following chemical composition was prepared:

| | |
|---|---|
| $C_3H_7$—⬡—◯—CN | 24% |
| $C_5H_{11}$—⬡—◯—CN | 36% |
| $C_7H_{15}$—⬡—◯—CN | 25% |
| $C_5H_{11}$—⬡—◯—◯—CN | 15% |
| $C_2H_5$—*CH(CH_3)—CH_2O—◯—◯—CN | 1 part |

This liquid crystal composition had a clearing point ($T_{NI}$) of 71.6° C., viscosity at 20° C. ($\eta_{20}$) of 27.3 mPa·s, pitch length at 25° C. ($P_{25}$) of 63.0 μm, and temperature dependency of the pitch (δP) of 0.86.

Example 1

Liquid crystal composition having the following chemical composition was prepared:

| | |
|---|---|
| $C_2H_5$—⬡—⬡—◯—CN | 6% |
| $C_3H_7$—⬡—⬡—◯—CN | 6% |
| $C_3H_7$—⬡—◯—CN | 25% |
| $CH_3OCH_2$—⬡—⬡—$C_3H_7$ | 11% |
| $CH_3OCH_2$—⬡—⬡—$C_5H_{11}$ | 11% |
| $CH_3$—◯—C≡C—◯—$C_6H_{13}$ | 6% |
| $C_2H_5$—◯—C≡C—◯—$CH_3$ | 3% |
| $C_4H_9$—◯—C≡C—◯—$C_4H_9$ | 3% |

-continued

| | |
|---|---|
| $C_3H_7$—⬡—⬢—$OC_2H_5$ | 5% |
| $C_3H_7$—⬡—⬡—⬢—$CH_3$ | 6% |
| $C_3H_7$—⬡—⬢(F)—C≡C—⬢—$C_2H_5$ | 6% |
| $C_3H_7$—⬡—⬢(F)—C≡C—⬢—$C_3H_7$ | 6% |
| $C_3H_7$—⬡—⬢(F)—C≡C—⬢—$C_4H_9$ | 6% |
| $C_8H_{17}O$—⬢—⬢—COO—*CH($C_2H_5$)—⬢ | 1 part |

This liquid crystal composition had a clearing point ($T_{NI}$) of 88.1° C., viscosity at 20° C. ($\eta_{20}$) of 23.3 mPa·s, pitch length at 25° C. ($P_{25}$) of 5.6 μm, and temperature dependency of the pitch (δP) of 0.18.

Liquid crystal composition of this example had a high clearing point and low viscosity compared with that in Comparative Example 1 wherein the same optically active compound as in this example was used as chiral component and compared with that in Comparative Example 2. Also, the liquid crystal composition of this example had a high clearing point, low viscosity, and small δP compared with that in Comparative Example 3.

Example 2

Liquid crystal composition having the following chemical composition was prepared:

| | |
|---|---|
| $C_2H_5$—⬢—COO—⬢—CN | 7% |
| $C_3H_7$—⬢—COO—⬢—CN | 7% |
| $CH_3OCH_2$—⬡—⬡—$C_3H_7$ | 10% |
| $CH_3OCH_2$—⬡—⬡—$C_5H_{11}$ | 10% |
| $C_3H_7$—⬡—⬢—$OC_2H_5$ | 10% |
| $C_3H_7$—⬡—⬢—$OC_4H_9$ | 10% |
| $C_2H_5$—⬡—⬡—⬢—$CH_3$ | 5% |
| $C_3H_7$—⬡—⬡—⬢—$CH_3$ | 10% |
| $C_3H_7$—⬡—⬡—⬢—$OCH_3$ | 5% |
| $C_3H_7$—⬡—⬡—⬢—$C_3H_7$ | 18% |
| $C_3H_7$—⬡—⬡—$COOCH_3$ | 8% |
| $C_5H_{11}O$—⬢—⬢—COO—*CH($CH_3$)—⬢(CN) | 1 part |

This liquid crystal composition had a clearing point ($T_{NI}$) of 84.6° C., viscosity at 20° C. ($\eta_{20}$) of 22.2 mPa·s, pitch length at 25° C. ($P_{25}$) of 5.5 μm, and temperature dependency of the pitch (δP) of −0.20.

Liquid crystal composition of this example had a high clearing point and low viscosity compared with that in Comparative Example 1, and that in Comparative Example 2 where the same optically active compound as in this example was used as chiral component. Also, the liquid crystal composition of this example had a high clearing point, low viscosity, and small δP compared with that in Comparative Example 3.

Example 3

Liquid crystal composition having the following chemical composition was prepared:

| | |
|---|---|
| $C_2H_5$—⬢—⬢—CN | 12% |
| $C_4H_9$—⬢—⬢—CN | 8% |
| $C_5H_{11}$—⬢—⬢—CN | 4% |
| $C_2H_5$—⬡—⬡—⬢—CN | 4% |
| $C_3H_7$—⬡—⬡—⬢—CN | 8% |
| $C_2H_5$—⬡—⬢—CN | 10% |
| $CH_3OCH_2$—⬡—⬡—$C_3H_7$ | 8% |
| $CH_3OCH_2$—⬡—⬡—$C_5H_{11}$ | 8% |
| $C_3H_7$—⬡—⬡—⬢—$CH_3$ | 8% |

-continued

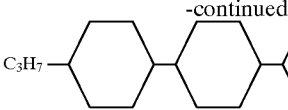 4%

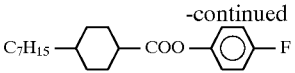 10%

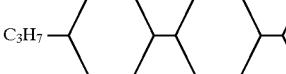 8%

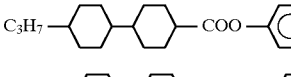 4%

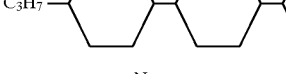 4%

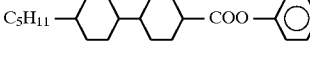 0.05 part

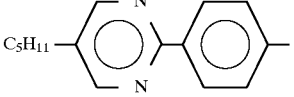 0.05 part

This liquid crystal composition had a clearing point ($T_{NI}$) of 82.9° C., viscosity at 20° C. ($\eta_{20}$) of 20.7 mPa·s, pitch length at 25° C. ($P_{25}$) of 245.3 μm, and temperature dependency of the pitch ($\delta P$) of 0.16.

Liquid crystal composition of this example had a remarkably high clearing point and a low viscosity compared with those in Comparative Example 1 and Comparative Example 2. Also, the liquid crystal composition of this example had a high clearing point, low viscosity, and small δP compared with that in Comparative Example 3.

Example 4

Liquid crystal composition having the following chemical composition was prepared:

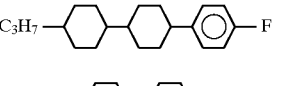 10%

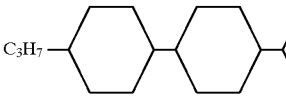 20%

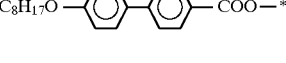 5%

 10%

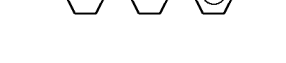 18%

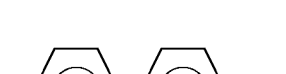 13%

-continued

 13%

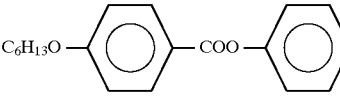 3%

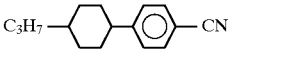 3%

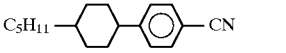 5%

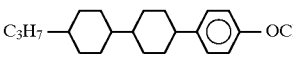 0.02 part

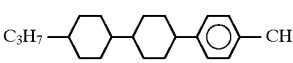 0.05 part

This liquid crystal composition had a clearing point ($T_{NI}$) of 88.2° C., viscosity at 20° C. ($\eta_{20}$) of 20.8 mPa·s, pitch length at 25° C. ($P_{25}$) of 54.9 μm, and temperature dependency of the pitch ($\delta P$) of 0.19.

Example 5

Liquid crystal composition having the following chemical composition was prepared:

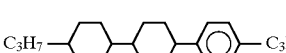 14%

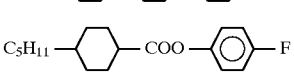 15%

 8%

11%

5%

5%

10%

-continued

C₂H₅—[Cy]—[Cy]—[Ph(F,F)] 9%

C₃H₇—[Cy]—[Cy]—[Ph(F,F)] 9%

C₅H₁₁—[Cy]—[Cy]—[Ph(F,F)] 9%

CH₃OCH₂—[Cy]—[Ph]—[Ph]—[Cy]—C₃H₇ 5%

C₅H₁₁O—[Ph]—[Ph]—COO—*CH(CH₃)—[Ph(CN)] 0.50 part

C₂H₅—*CH(CH₃)—CH₂O—[Ph]—[Ph]—CN 0.15 part

This liquid crystal composition had a clearing point ($T_{NI}$) of 90.9° C., viscosity at 20° C. ($\eta_{20}$) of 25.8 mPa·s, pitch length at 25° C. ($P_{25}$) of 105.3 μm, and temperature dependency of the pitch ($\delta P$) of 0.32.

Example 6

Liquid crystal composition having the following chemical composition was prepared:

C₂H₅OCH₂—[Ph]—COO—[Ph(F)]—CN 4%

C₃H₇OCH₂—[Ph]—COO—[Ph(F)]—CN 15%

CH₃CH=CHC₂H₄—[Ph]—COO—[Ph(F,F)]—CN 9%

CH₂=CHC₂H₄—[Cy]—[Ph]—CN 9%

C₃H₇—[Cy]—[Ph]—OC₂H₅ 7%

-continued

C₃H₇—[Cy]—[Cy]—C₄H₉ 9%

C₃H₇—[Cy]—[Cy]—[Ph]—CH₃ 8%

C₃H₇—[Cy]—[Cy]—[Ph]—OCH₃ 5%

C₃H₇—[Cy]—[Cy]—[Ph]—C₃H₇ 6%

C₃H₇—[Cy]—CH₂CH₂—[Ph]—C≡C—[Ph]—C₂H₅ 4%

C₃H₇—[Cy]—CH₂CH₂—[Ph]—C≡C—[Ph]—C₃H₇ 4%

C₃H₇—[Cy]—CH₂CH₂—[Ph]—C≡C—[Ph]—C₄H₉ 4%

C₂H₅—[Cy]—CH₂CH₂—[Ph]—C≡C—[Ph]—C₂H₅ 2%

C₃H₇—[Cy]—[Cy]—COO—[Ph]—F 5%

C₅H₁₁—[Cy]—[Cy]—COO—[Ph]—F 5%

C₃H₇—[Cy]—[Cy]—[Ph]—F 4%

C₈H₁₇O—[Ph]—[Ph]—COO—*CH(C₂H₅)—[Ph] 0.1 part

C₆H₁₃—*CHO(CH₃)—[Ph]—COO—[Ph]—C₅H₁₁ 3.0 parts

This liquid crystal composition had a clearing point ($T_{NI}$) of 89.5° C., viscosity at 20° C. ($\eta_{20}$) of 25.9 mPa·s, pitch length at 25° C. ($P_{25}$) of 75.4 μm, and temperature dependency of the pitch ($\delta P$) of -0.31.

Example 7

Liquid crystal composition having the following chemical composition was prepared:

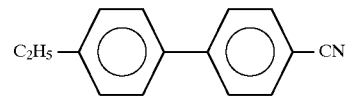 8%
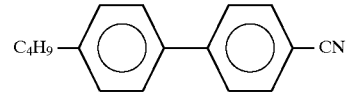 8%
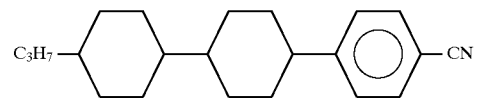 6%
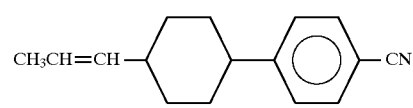 12%
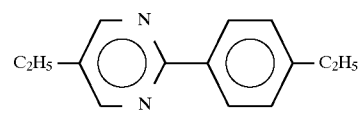 4%
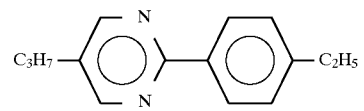 4%
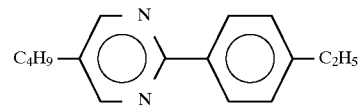 4%
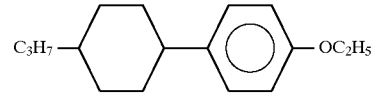 6%
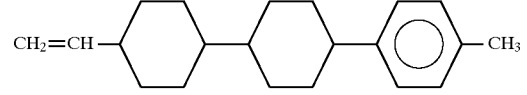 6%
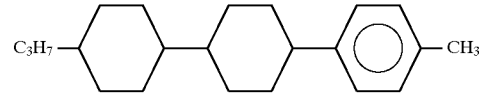 8%
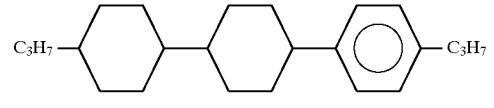 16%
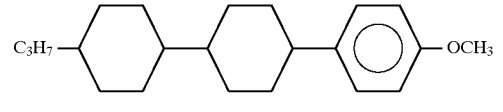 4%
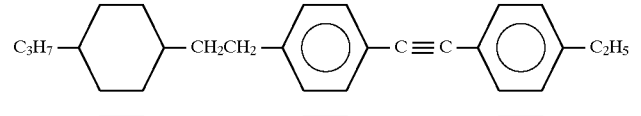 4%
 4%
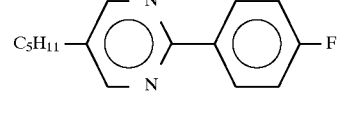 6%
CN  0.03 part This liquid crystal composition had a clearing point ($T_{NI}$) of 87.0° C., viscosity at 20° C. ($\eta_{20}$) of 21.6 mPa·s, pitch length at 25° C. ($P_{25}$) of 22.1 μm, and temperature dependency of the pitch ($\delta P$) of 0.11.

Example 8

Liquid crystal composition having the following chemical composition was prepared:

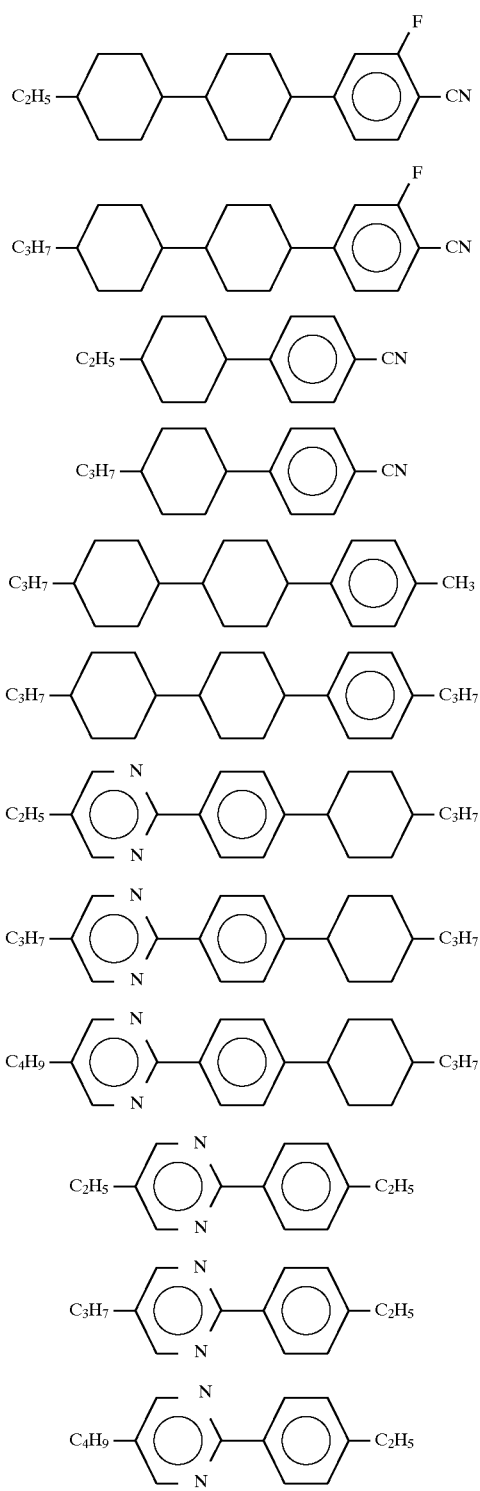
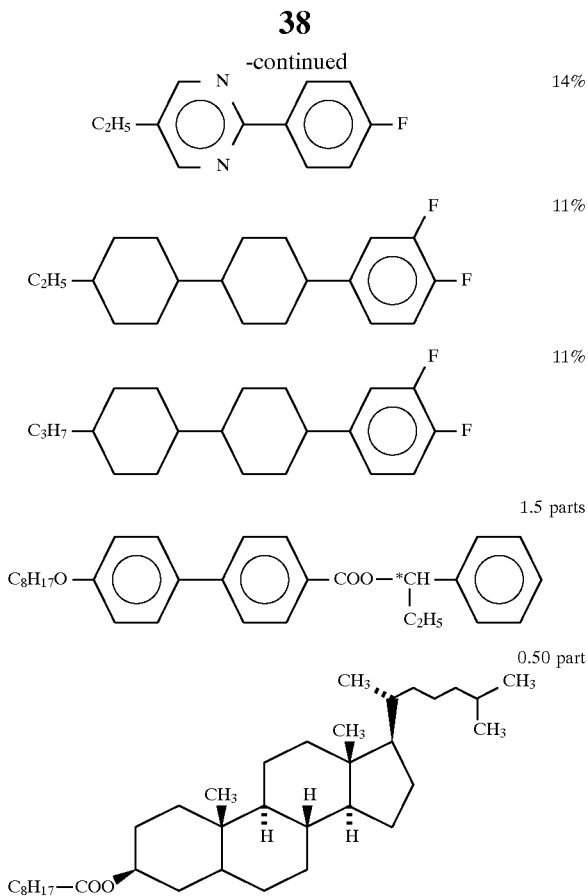

This liquid crystal composition had a clearing point ($T_{NI}$) of 83.3° C., viscosity at 20° C. ($\eta_{20}$) of 28.3 mPa·s, pitch length at 25° C. ($P_{25}$) of 3.8 μm, and temperature dependency of the pitch ($\delta P$) of 0.14.

Example 9

Liquid crystal composition having the following chemical composition was prepared:

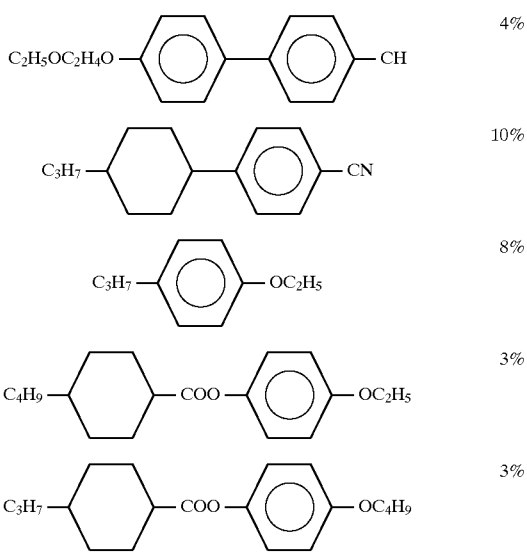

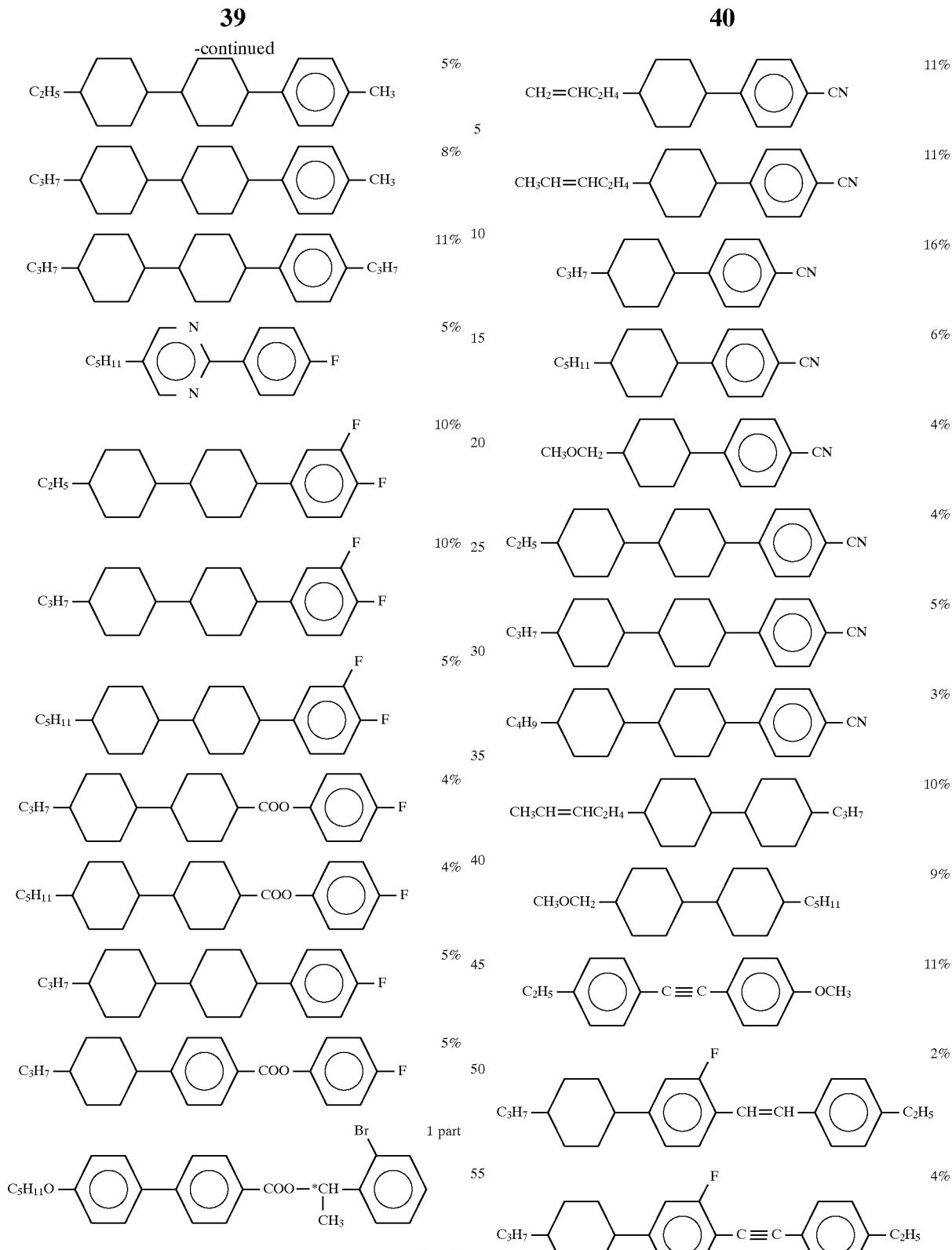
This liquid crystal composition had a clearing point ($T_{NI}$) of 100.8° C., viscosity at 20° C. ($\eta_{20}$) of 21.3 mPa·s, pitch length at 25° C. ($P_{25}$) of 8.6 μm, and temperature dependency of the pitch (δP) of −0.11.
Example 10
Liquid crystal composition having the following chemical composition was prepared:

-continued
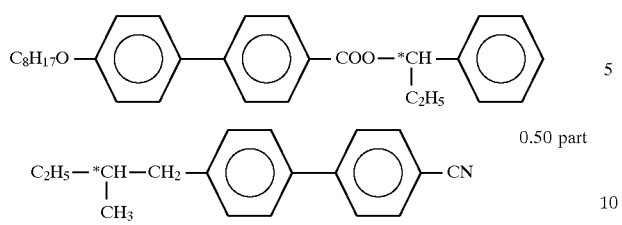
0.05 part
0.50 part
This liquid crystal composition had a clearing point ($T_{NI}$) of 78.5° C., viscosity at 20° C. ($\eta_{20}$) of 26.9 mPa·s, pitch length at 25° C. ($P_{25}$) of 4.3 μm, and temperature dependency of the pitch (δP) of 0.19.
Example 11
Liquid crystal composition having the following chemical composition was prepared:
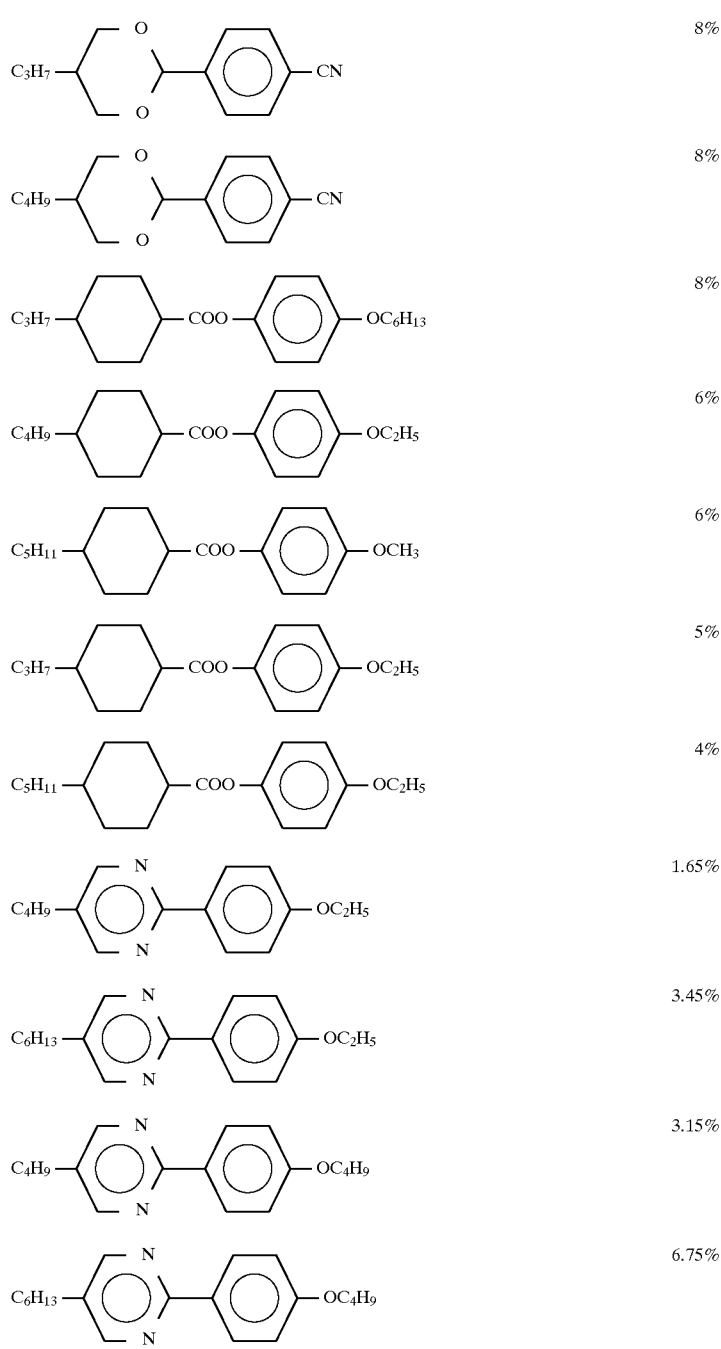

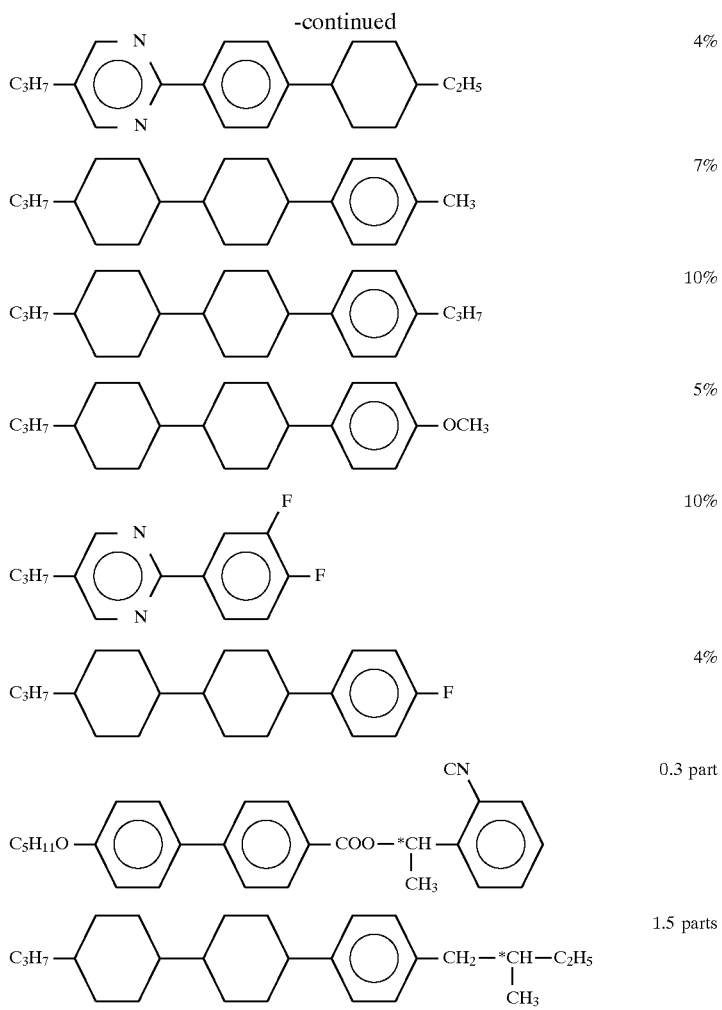
| | |
|---|---|
| | 4% |
| | 7% |
| | 10% |
| | 5% |
| | 10% |
| | 4% |
| | 0.3 part |
| | 1.5 parts |
This liquid crystal composition had a clearing point ($T_{NI}$) of 72.4° C., viscosity at 20° C. ($\eta_{20}$) of 26.8 mPa·s, pitch length at 25° C. ($P_{25}$) of 85.6 μm, and temperature dependency of the pitch ($\delta P$) of 0.22.
Example 12
Liquid crystal composition having the following chemical composition was prepared:
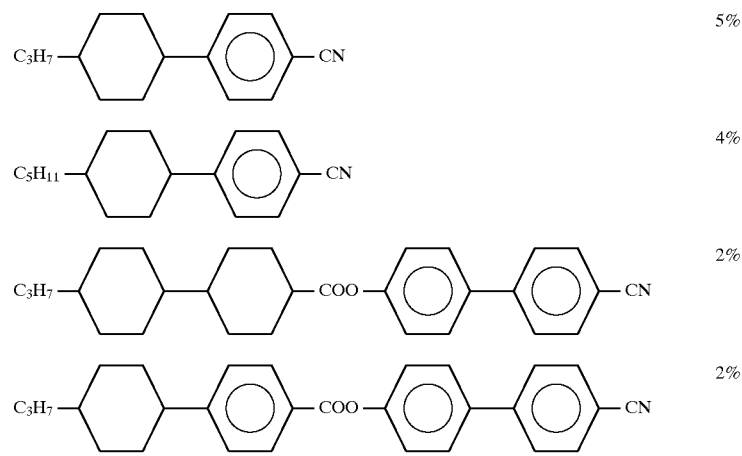
| | |
|---|---|
| | 5% |
| | 4% |
| | 2% |
| | 2% |

-continued
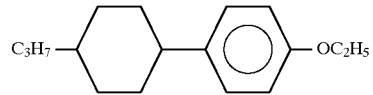 10%
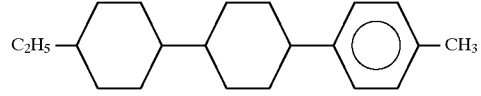 6%
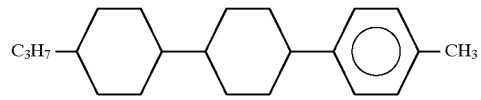 9%
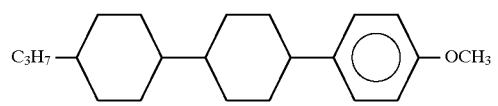 5%
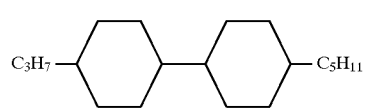 2%
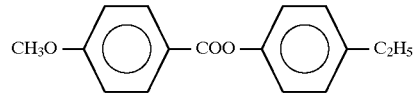 3%
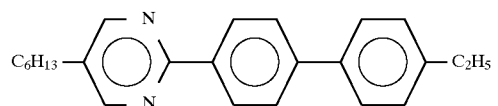 2%
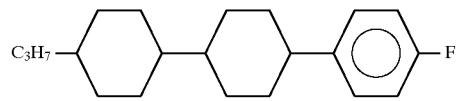 2%
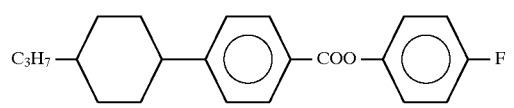 5%
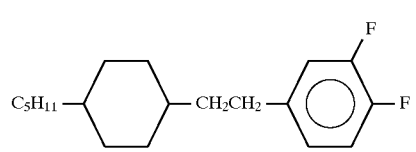 8%
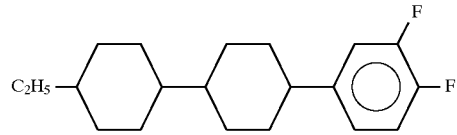 4%
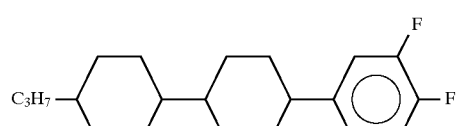 4%
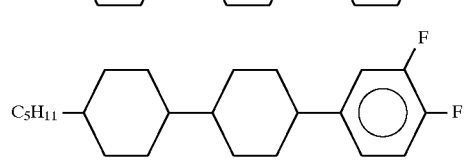 4%
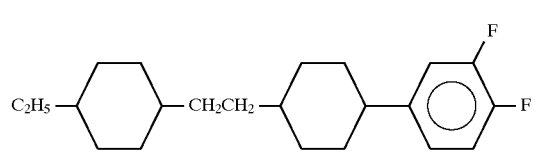 4%

This liquid crystal composition had a clearing point ($T_{NI}$) of 101.0° C., viscosity at 20° C. ($\eta_{20}$) of 28.7 mPa·s, pitch length at 25° C. ($P_{25}$) of 14.1 μm, and temperature dependency of the pitch (δP) of 0.13.

Example 13

Liquid crystal composition having the following chemical composition was prepared:

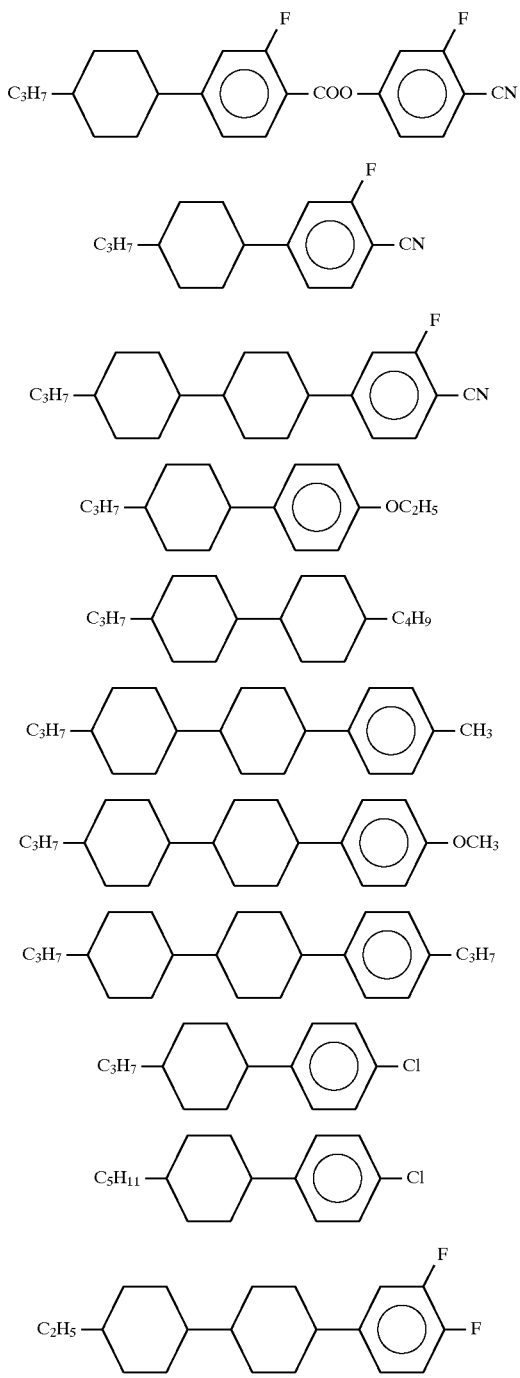

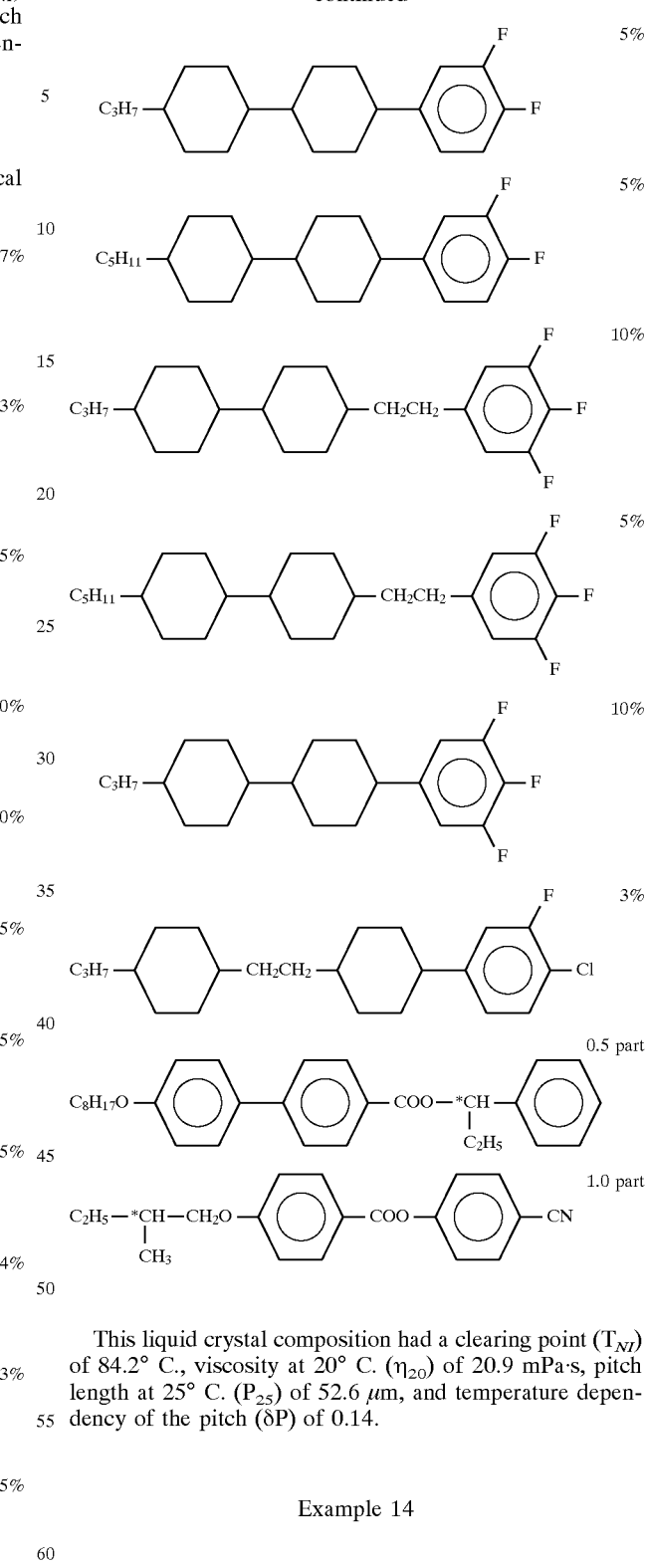

This liquid crystal composition had a clearing point ($T_{NI}$) of 84.2° C., viscosity at 20° C. ($\eta_{20}$) of 20.9 mPa·s, pitch length at 25° C. ($P_{25}$) of 52.6 μm, and temperature dependency of the pitch (δP) of 0.14.

Example 14

Liquid crystal composition having the following chemical composition was prepared:

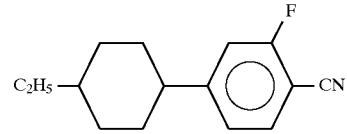 6%
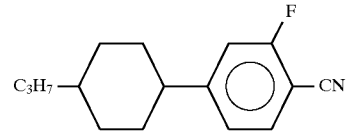 6%
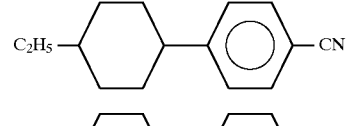 5%
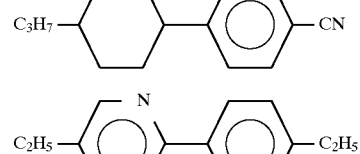 8%
 5%
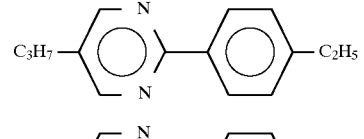 5%
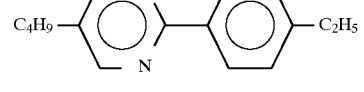 5%
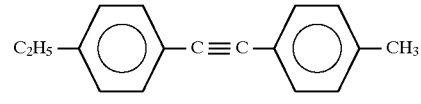 2.25%
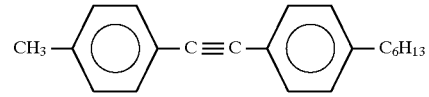 4.50%
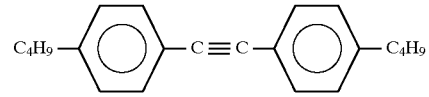 2.25%
 8%
 10%
 4%
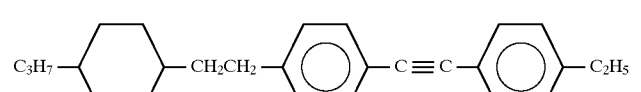 4%
 4%

This liquid crystal composition had a clearing point ($T_{NI}$) of 79.3° C., viscosity at 20° C. ($\eta_{20}$) of 26.7 mPa·s, pitch length at 25° C. ($P_{25}$) of 4.8 μm, and temperature dependency of the pitch ($\delta P$) of −0.07.

We claim:

1. A liquid crystal composition comprising (1) as a first component, at least one compound selected from the group consisting of the compounds expressed by any one of general formulas (I-a) to (I-e)

(I-a)

(I-b)

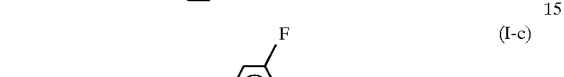
(I-c)

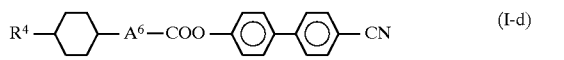
(I-d)

(I-e)

wherein $R^1$, $R^2$, $R^3$, $R^4$, and $R^5$ independently represent an alkyl group having 1 to 10 carbon atoms or an alkenyl group having 2 to 10 carbon atoms, any one or not-adjacent two or more methylene groups (—CH$_2$—) in said alkyl or alkenyl group may be replaced by oxygen atom (—O—), $A^1$ represents trans-1,4-cyclohexylene, 1,4-phenylene, or 1,3-dioxane-trans-2,5-diyl, $A^2$, $A^3$, $A^4$, $A^5$, and $A^6$ independently represent trans-1,4-cyclohexylene or 1,4-phenylene, $Z^1$ represents —COO—, —CH$_2$CH$_2$—, or single bond provided that when $A^1$ represents trans-1,4-cyclohexylene, $Z^1$ does not represent single bond; $Z^2$ represents —CH$_2$CH$_2$— or single bond provided that when $A^2$ represents trans-1,4-cyclohexylene and $A^3$ represents 1,4-phenylene, $Z^2$ does not represent single bond; $Z^3$ represents —CH$_2$CH$_2$—, or single bond, $Z^4$ represents —COO—, —CH$_2$CH$_2$—, or single bond, $Q^1$ represents H or F, i is 0 or 1, and j is 1 or 2, (2) as a second component, at least one compound expressed by general formula (II), (III), or (IV)

(II)

wherein $R^6$ and $R^7$ independently represent an alkyl group having 1 to 1.0 carbon atoms or an alkenyl group having 2 to 8 carbon atoms, any one or not-adjacent two or more methylene groups (—CH$_2$—) in said alkyl or alkenyl group may be replaced by oxygen atom (—O—), B represents trans-1,4-cyclohexylene, pyrimidine-2,5-diyl, or 1,4-phenylene, C represents trans-1,4-cyclohexylene or 1,4-phenylene, and $Z^5$ represents —C≡C—, —COO—, —CH$_2$CH$_2$—, —CH=CH—, —CF=CF—, or single bond, $R^8$—D—$Z^6$—E—$Z^7$—G—$R^9$ (III)

wherein $R^8$ represents an alkyl group having 1 to 10 carbon atoms or an alkenyl group having 2 to 10 carbon atoms, any one or not-adjacent two or more methylene groups (—CH$_2$—) in said alkyl or alkenyl group may be replaced by oxygen atom (—O—), $R^9$ represents an alkyl group, alkoxy group, or alkoxymethyl group having 1 to 10 carbon atoms, D represents trans-1,4-cyclohexylene or pyrimidine-2,5-diyl, E represents trans-1,4-cyclohexylene, or 1,4-phenylene one of H at a side position of which may be replaced by F, G represents trans-1,4-cyclohexylene or 1,4-phenylene, $Z^6$ represents —CH$_2$CH$_2$— or single bond, and $Z^7$ represents —C≡C—, —COO—, —CH=CH—, or single bond,

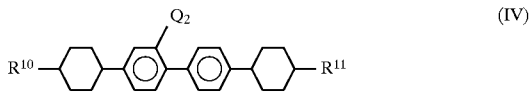
(IV)

wherein $R^{10}$ represents an alkyl group having 1 to 10 carbon atoms or an alkenyl group having 2 to 10 carbon atoms, any one or not-adjacent two or more methylene groups (—CH$_2$—) in said alkyl or alkenyl group may be replaced by oxygen atom (—O—), $R^{11}$ represents an alkyl group, alkoxy group, or alkoxymethyl group having 1 to 10 carbon atoms, and $Q^2$ represents H or F, and as chiral component A, at least one optically active compound expressed by general formula (X-a) or (X-b)

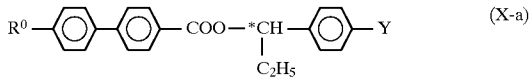
(X-a)

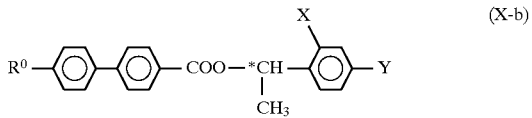
(X-b)

wherein $R^0$ represents an alkyl group or alkoxy group having 1 to 10 carbon atoms, X represents a halogen atom or CN, and Y represents an alkyl group having 1 to 10 carbon atoms or hydrogen atom.

2. The liquid crystal composition according to claim 1 which further comprises, as chiral component B, at least one optically active compound selected from the group consisting of the compounds expressed by any one of general formulas (XI-a) to (XI-h)

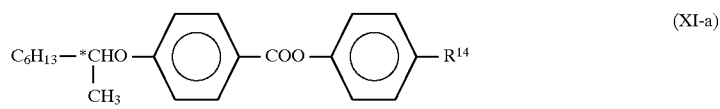
(XI-a)

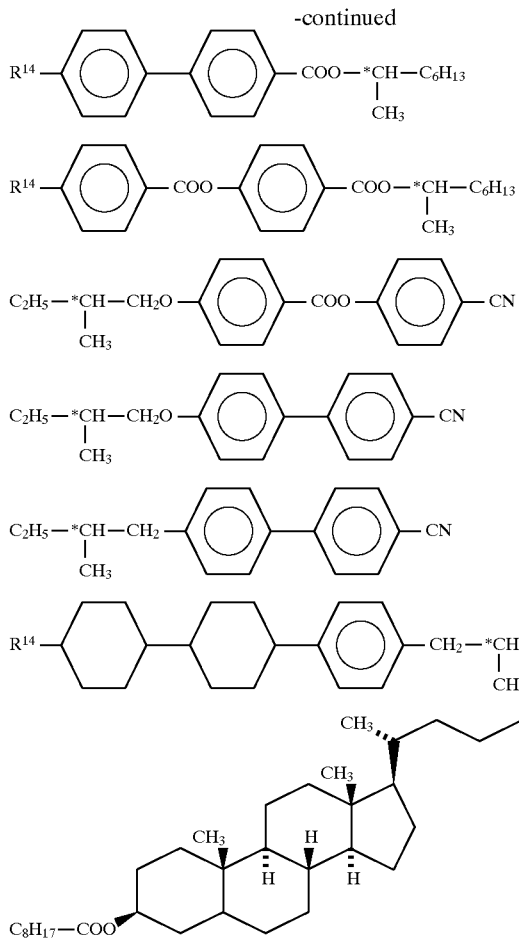

wherein R$^{14}$ represents an alkyl group or alkoxy group having 1 to 10 carbon atoms.

3. The liquid crystal composition according to claim 1 which comprises (1) 10 to 60%, based on the total weight of said liquid crystal composition, of said first component, (2) 20 to 80%, based on the total weight of said liquid crystal composition, of said second component, and 0.001 to 5 parts by weight, based on 100 parts by weight of the liquid crystal composition comprising said first component and second component, of said chiral component A.

4. The liquid crystal composition according to claim 1 which further comprises, (3) as a third component, at least one compound expressed by general formula (V) or (VI)

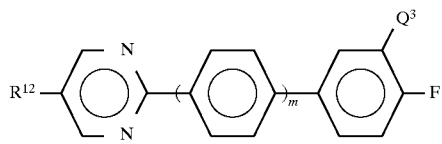

wherein R$^{12}$ represents an alkyl group having 1 to 10 carbon atoms, Q$^3$ represents H or F, and m is 0 or 1,

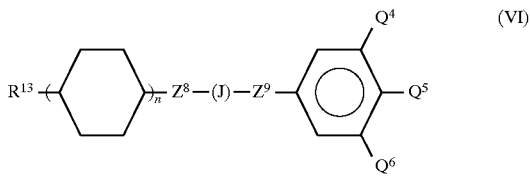

wherein R$^{13}$ represents an alkyl group having 1 to 10 carbon atoms, J represents trans-1,4-cyclohexylene, or 1,4-phenylene one or two H at a side position of which may be replaced by F, Q$^5$ represents F or Cl, Q$^4$ and Q$^6$ independently represent H or F, Z$^8$ and Z$^9$ independently represent —COO—, —CH$_2$CH$_2$—, or single bond, and n is 0, 1, or 2.

5. The liquid crystal composition according to claim 4 wherein the content of said third component is up to 50% by weight based on the total weight of said liquid crystal composition.

6. The liquid crystal composition according to claim 1 wherein said first component is at least one of the compounds expressed by one of said general formulas (I-a) to (I-e) wherein R$^1$ to R$^5$ independently represent an alkyl group, alkoxy group, or alkoxymethyl group having 1 to 10 carbon atoms.

7. The liquid crystal composition according to claim 1 wherein said second component is at least one of the compounds expressed by said general formula (II) wherein R$^6$ and R$^7$ independently represent an alkyl group, alkoxy group, or alkoxymethyl group having 1 to 10 carbon atoms.

8. The liquid crystal composition according to claim 1 wherein said second component is at least one of the compounds expressed by said general formula (III) wherein $R^8$ represents an alkyl group having 1 to 10 carbon atoms, and $R^9$ represents an alkyl group or alkoxy group having 1 to 10 carbon atoms.

9. A liquid crystal display device comprising a liquid crystal composition defined in claim 1.

10. A liquid crystal display device comprising a liquid crystal composition defined in claim 2.

11. A liquid crystal display device comprising a liquid crystal composition defined in claim 3.

12. A liquid crystal display device comprising a liquid crystal composition defined in claim 4.

13. A liquid crystal display device comprising a liquid crystal composition defined in claim 5.

14. A liquid crystal display device comprising a liquid crystal composition defined in claim 6.

15. A liquid crystal display device comprising a liquid crystal composition defined in claim 7.

16. A liquid crystal display device comprising a liquid crystal composition defined in claim 8.

17. The liquid crystal composition according to claim 2 which comprises (1) 10 to 60%, based on the total weight of said liquid crystal composition, of said first component, (2) 20 to 80%, based on the total weight of said liquid crystal composition, of said second component, 0.001 to 5 parts by weight, based on 100 parts by weight of the liquid crystal composition comprising said first component and second component, of said chiral component A, and up to 5 parts by weight, based on 100 parts by weight of the liquid crystal composition comprising said first component and second component, of said chiral component B.

18. A liquid crystal display device comprising a liquid crystal composition defined in claim 17.

* * * * *